US010873136B1

(12) United States Patent
Struhsaker et al.

(10) Patent No.: US 10,873,136 B1
(45) Date of Patent: Dec. 22, 2020

(54) METHODS FOR FORMATION OF ANTENNA ARRAY FROM SUB-ARRAYS

(71) Applicant: TIONESTA, LLC, Austin, TX (US)

(72) Inventors: Paul Struhsaker, Austin, TX (US); Paul Posner, Austin, TX (US); Shayan Mohajer Hamidi, Austin, TX (US); Amir Keyvan Khandani, Austin, TX (US)

(73) Assignee: TIONESTA, LLC, Austin, TX (US)

( * ) Notice: Subject to any disclaimer, the term of this patent is extended or adjusted under 35 U.S.C. 154(b) by 0 days.

(21) Appl. No.: 16/845,498

(22) Filed: Apr. 10, 2020

Related U.S. Application Data

(62) Division of application No. 16/557,118, filed on Aug. 30, 2019.

(51) Int. Cl.
| | |
|---|---|
| *H04W 24/00* | (2009.01) |
| *H01Q 21/00* | (2006.01) |
| *H04B 7/185* | (2006.01) |
| *H01Q 1/12* | (2006.01) |
| *H01Q 21/06* | (2006.01) |
| *H01Q 3/36* | (2006.01) |

(52) U.S. Cl.
CPC ......... *H01Q 21/0025* (2013.01); *H01Q 1/125* (2013.01); *H01Q 3/36* (2013.01); *H01Q 21/065* (2013.01); *H04B 7/18513* (2013.01); *H04B 7/18541* (2013.01)

(58) Field of Classification Search
CPC ...... H01Q 21/0025; H01Q 1/125; H01Q 3/36; H01Q 21/065; H04B 7/18513; H04B 7/18541
USPC .................................. 455/427, 562.1, 550.1
See application file for complete search history.

(56) References Cited

U.S. PATENT DOCUMENTS

| | | | | |
|---|---|---|---|---|
| 5,912,641 A | * | 6/1999 | Dietrich ............. | H04B 7/18536 342/353 |
| 5,945,945 A | * | 8/1999 | Wagner ................... | H01Q 3/06 342/359 |
| 6,157,668 A | * | 12/2000 | Gilhousen ............. | H04W 36/06 375/130 |
| 2010/0280373 A1 | * | 11/2010 | Fan ....................... | G01S 15/899 600/439 |

(Continued)

FOREIGN PATENT DOCUMENTS

| | | |
|---|---|---|
| FR | 2947388 A1 | 12/2010 |
| WO | 0103438 A2 | 1/2001 |

OTHER PUBLICATIONS

Partial European Search Report in corresponding European Application No. 20167899.2, dated Oct. 15, 2020 (18 pages).

*Primary Examiner* — Danh C Le
(74) *Attorney, Agent, or Firm* — Osha Bergman Watanabe & Burton LLP

(57) ABSTRACT

An antenna array system comprises a plurality of antenna elements arranged in an antenna array in a geometric shape. The antenna array system further includes a first sub-array that forms an interior of the antenna array and a second sub-array that forms an exterior of the antenna array. In addition, the first sub-array is a subset of the second sub-array. A number of antenna elements in the first sub-array is greater than a number of antenna elements in the second sub-array. The antenna array system determines an exact satellite location of a satellite within a solid angle of ambiguity using a first virtual pattern and a second virtual pattern.

4 Claims, 33 Drawing Sheets

(56) References Cited

U.S. PATENT DOCUMENTS

| | | | |
|---|---|---|---|
| 2012/0301136 A1* | 11/2012 | Chang | H04B 7/0413 |
| | | | 398/16 |
| 2016/0014786 A1* | 1/2016 | Chang | H04N 21/6143 |
| | | | 370/316 |
| 2017/0054211 A1* | 2/2017 | Gallagher | H01Q 21/064 |
| 2017/0149144 A1* | 5/2017 | Gallagher | H01Q 13/0258 |
| 2019/0064338 A1* | 2/2019 | Holt | G01S 13/87 |
| 2020/0052373 A1* | 2/2020 | Xia | H01Q 1/1207 |

* cited by examiner

| Azimuth | Elevation | Antenna1 | Antenna2 | .... | Antenna N |
|---|---|---|---|---|---|
| 0° | 0° | $C_1^1$ | $C_2^1$ | ... | $C_N^1$ |
| 0° | 0.5° | $C_1^2$ | $C_2^2$ | ... | $C_N^2$ |
| ⋮ | ⋮ | ⋮ | ⋮ | ⋮ | ⋮ |

METHODS FOR FORMATION OF ANTENNA ARRAY FROM SUB-ARRAYS

This Application is a Division of application Ser. No. 16/557,118 filed on Aug. 30, 2019. The entire contents of these applications are incorporated herein by reference in their entirety.

BACKGROUND OF INVENTION

Field of the Invention

The invention generally relates to wireless communication. More specifically, the invention relates to using an antenna system to receive and process wireless communication signals transmitted from satellites.

Background Art

A growing number of broadband satellite constellations are being launched to support communication networks around the world, even in the most remote field environments. Remote field environments often have minimal or no satellite networking infrastructure to interact with these satellite constellation. Accordingly, a satellite communication terminal that communicates with satellites in orbit and that established and maintains a local network on the ground may be beneficial users operating in or travelling across the field environment. Furthermore, a satellite communication terminal that provides access to the internet, a cloud computing platform, a sensor network, or a monitoring system may be beneficial or even essential to the user.

Antenna arrays are often used to communicate with remote objects such as satellites. Traditional antenna arrays are formed as a collection of antenna elements which are combined at Radio Frequency (RF) upon adjustments in their relative phase values. The adjustment of phase values provides the means to steer the antenna beam in a direction of interest. These traditional structures rely on: (1) a single receive path for frequency down-conversion and base-band processing of the received signal (upon combining at the RF), and (2) a single transmit path for base-band processing and frequency up-conversion of the transmit signal. These traditional approaches are too rigid and cannot easily handle requirements such as: "acquisition and tracking of a satellite", "soft handoff in transition from one satellite to another one", "realize potential gains due to maximum ratio combining of signals corresponding to different segments of the antenna aperture", "reducing the interference caused by a neighboring satellite", and "compensating for low isolation between Right Hand Circular (RHC) and Left Hand Circular (LHC) polarizations caused by an imbalance in the magnitude/phase of the vertical and horizontal linear polarizations".

SUMMARY OF INVENTION

In one aspect, embodiments disclosed herein generally relate to an antenna array system comprises a plurality of antenna elements arranged in an antenna array in a geometric shape. The antenna array system further includes a first sub-array that forms an interior of the antenna array and a second sub-array that forms an exterior of the antenna array. In addition, the first sub-array is a subset of the second sub-array. A number of antenna elements in the first sub-array is greater than a number of antenna elements in the second sub-array. The antenna array system determines an exact satellite location of a satellite within a solid angle of ambiguity using a first virtual pattern and a second virtual pattern.

In another aspect, embodiments disclosed herein relate to an antenna array system comprises a plurality of antenna elements arranged in an antenna array in a geometric shape. The antenna array system further includes a first sub-array that forms an interior of the antenna array and a second sub-array that forms an exterior of the antenna array. In addition, the first sub-array is a subset of the second sub-array. A number of antenna elements in the first sub-array is greater than a number of antenna elements in the second sub-array. The antenna array system tracks a moving satellite.

In another aspect, embodiments disclosed herein relate to an antenna array system comprise a plurality of antenna elements arranged in an antenna array in a geometric shape. The antenna array system further includes a first sub-array that forms an interior of the antenna array and a second sub-array that forms an exterior of the antenna array. In addition, the first sub-array is a subset of the second sub-array. A number of antenna elements in the first sub-array is greater than a number of antenna elements in the second sub-array. The antenna array system is used to perform a soft hand-off between an outgoing satellite leaving an area with line-of-sight connection to the antenna array system and an incoming satellite entering the area with line-of-sight connection to the antenna array system.

Other aspects and advantages of the invention will be apparent from the following description and the appended claims.

DETAILED DESCRIPTION

Figure 1A:
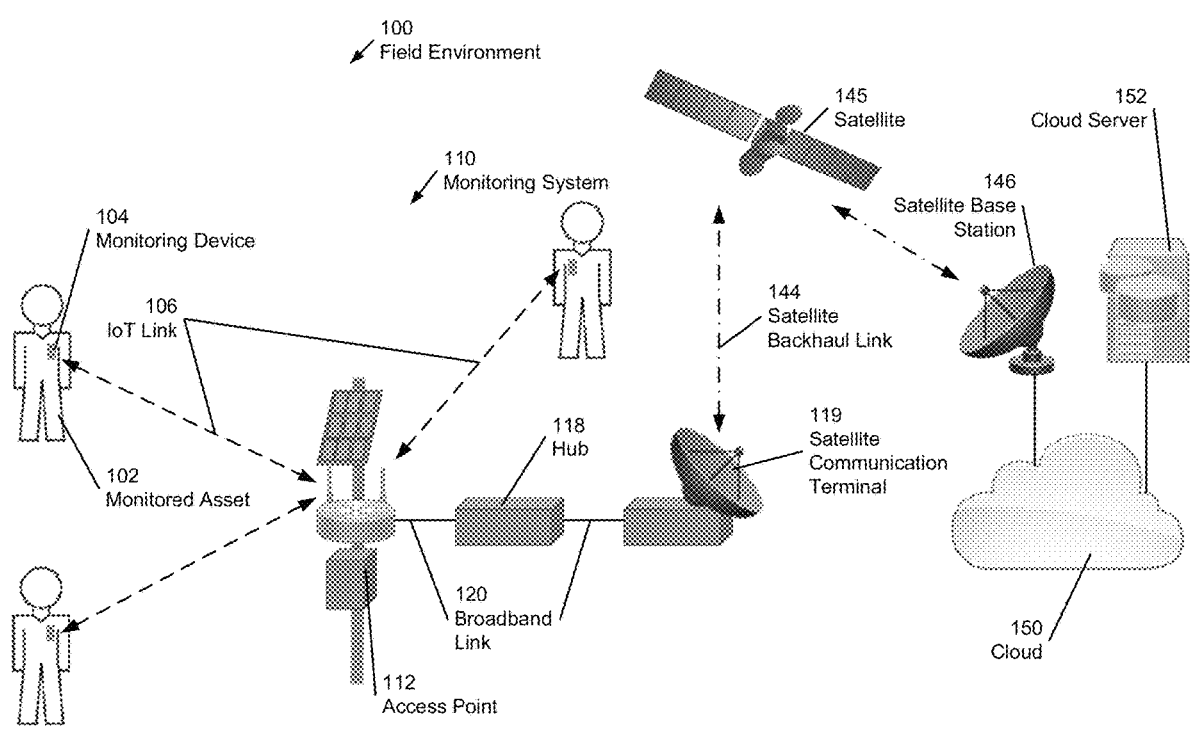
FIGS. 1A-1J show satellite communication systems in field environments, in accordance with one or more embodiments of the invention.

Specific embodiments of the invention will now be described in detail with reference to the accompanying figures Like elements in the various figures are denoted by like reference numerals for consistency. Like elements may not be labeled in all figures for the sake of simplicity.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers does not imply or create a particular ordering of the elements or limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1A-9, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a horizontal beam" includes reference to one or more of such beams.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that, one or more of the steps shown in the flowcharts may be omitted, repeated, and/or performed in a different order than the order shown. Accordingly, the scope of the invention should not be considered limited to the specific arrangement of steps shown in the flowcharts.

Although multiply dependent claims are not introduced, it would be apparent to one of ordinary skill that the subject matter of the dependent claims of one or more embodiments may be combined with other dependent claims.

In general, one or more embodiments are directed to techniques of grouping the antenna elements forming the array and thereby divided among sub-arrays, and each sub-array relies on its dedicated receive chain (for receiver arrays) or transmit chain (for transmitter arrays). By adjusting the relative complex gains between the signals corresponding to sub-arrays, many of the shortcomings of traditional approaches mentioned earlier are remedied. By adjusting the relative complex gains of the sub-arrays, an effect equivalent to a virtual antenna pattern is created, and multiple such virtual patterns may be simultaneously formed and measured at the base-band. These additional measurements will be used in various embodiments, for example to facilitate acquisition/tracking or to improve Signal-to-Interference-plus Noise Ratio (SINR).

Embodiments of the invention may be used in any field environment, including commercial, industrial, residential and natural environments of any size. Further, the communication network supported by the satellite communication terminal applies to any type of communication or exchange of information (e.g., voice, text, video, multimedia, sensor, or monitoring data).

FIGS. 1A-1J show satellite communication systems in field environments, in accordance with one or more embodiments of the invention.

In one or more embodiments exemplified by FIG. 1A, a field environment 100 includes a satellite communication system comprising a monitoring system 110 and a satellite communication terminal 119. The field environment 100 may be any type of environment (e.g., an outdoor environment, an oil and gas facility, an area where environmental monitoring is performed, a national park, a remote location separated from networking infrastructure, a disaster site, a field hospital, etc.). A field environment 100 may also be an indoor environment (e.g., a warehouse, a school, a hospital, a prison, etc.). A field environment 100 may also include a combination of indoor and outdoor environments (e.g., a campus of a public or private institution). Any environment that is equipped with a satellite communication terminal 119 or user devices (e.g., smartphone 128, a laptop 130 shown in FIGS. 1D-1E) may be considered a field environment 100. Further, the local network is not limited to a monitoring system 110, but may provide any appropriate data service to various connected devices.

The satellite communication terminal 119 connects a local network (i.e., the monitoring system 110) in the field environment 100 with an external network or cloud computing platform (e.g., cloud 150) via a satellite backhaul link 144 to a satellite 145. The satellite 145 may be one or more geostationary or non-geostationary satellites (e.g., Low Earth Orbit (LEO) satellite) with a satellite radio transceiver. A field environment 100 anywhere on the planet may use the satellite communication terminal 119 to establish communications with the growing number of communication satellite constellations. The satellite 145 may relay communications with other satellites 145 or may directly relay communications to a satellite base station 146 connected to the cloud 150 or cloud server 152.

Within the field environment 100, monitored assets 102, may be tracked or monitored by the monitoring system 110. Monitored assets 102 may include stationary and/or moving assets. A moving asset 102 may be a person, an animal, equipment (e.g., a forklift truck), goods, products or other items, including luggage, shipments such as boxes or containers, etc. A stationary asset may be anything equipped with sensors to monitor function and/or environmental conditions. Examples for such stationary assets include weather stations, pumps, pipelines, refrigeration equipment, air quality sensors, etc. The monitoring may be performed by a monitoring device 104 that is carried by the monitored asset 102 or that is attached or installed on the monitored asset 102.

In one or more embodiments, a monitored asset 102 may be controlled via the monitoring system 110. A monitoring device 104 may interface with the monitored asset 102 to, for example, activate or deactivate functions, switch modes, etc. If the monitoring device 104 is also used for sensing, a closed loop operation via the monitoring system 110 may be implemented. Based on sensed conditions, the monitored asset may be controlled in order to change the sensed conditions.

In one or more embodiments, an access point 112 functions as an intervening device that facilitates one or more broadband links 120 and/or Internet of Things (IoT) links 106 between devices of the field environment 100. The access point 112 may be a permanent part of an established network infrastructure in the field environment 100 or a temporary installation to supplement the networking range, capacity, or capabilities of the satellite communication terminal 119. The access point 112 comprises multiple component and may further interface with a hub 118 (i.e., an intervening device that also supplements the networking range, capacity, or capabilities of the satellite communication terminal 119), which may perform processing of the data received from the monitored assets 102 via the access points 112. The hub 118 may operate in conjunction with or independently from the satellite communication terminal 119, as described below.

In one or more embodiments, data gathered from the monitored assets 102 is uploaded to the cloud 150 and is made accessible to users via a processing platform described below with reference to FIG. 2F. Additionally, or alternatively, the data may also be locally accessible via the hub 118, satellite communication terminal 119, or via the access point 112.

Figure 1B:
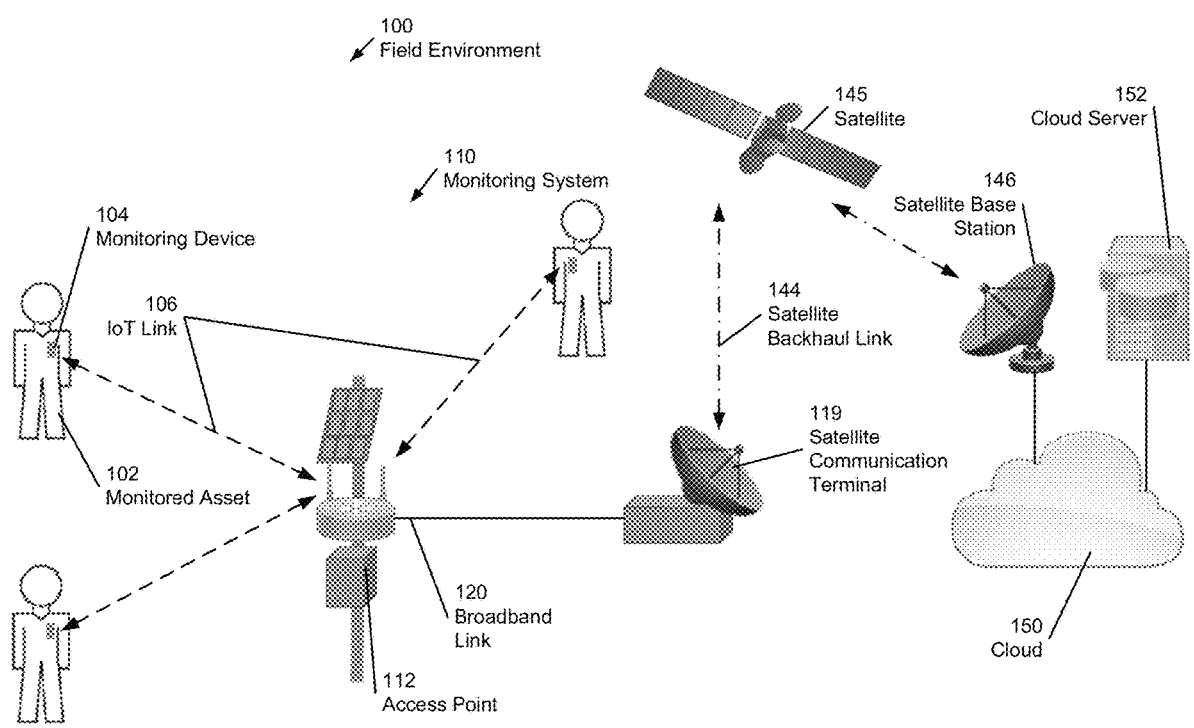

In one or more embodiments exemplified by FIG. 1B, an alternative configuration of the satellite communication system does not include the hub 118. The satellite communication terminal 119 may have the computing capacity to independently process all data and communications within the field environment 100. For example, a short range network may be quickly established by setting up the satellite communication terminal 119 and a single access point 112. If the network grows to a size that exceeds the processing capability of the satellite communication terminal 119, a hub 118 may be installed as an intervening device to supplement the networking range, capacity, or capabilities of the satellite communication terminal 119, as shown in FIG. 1A.

Figure 1C:
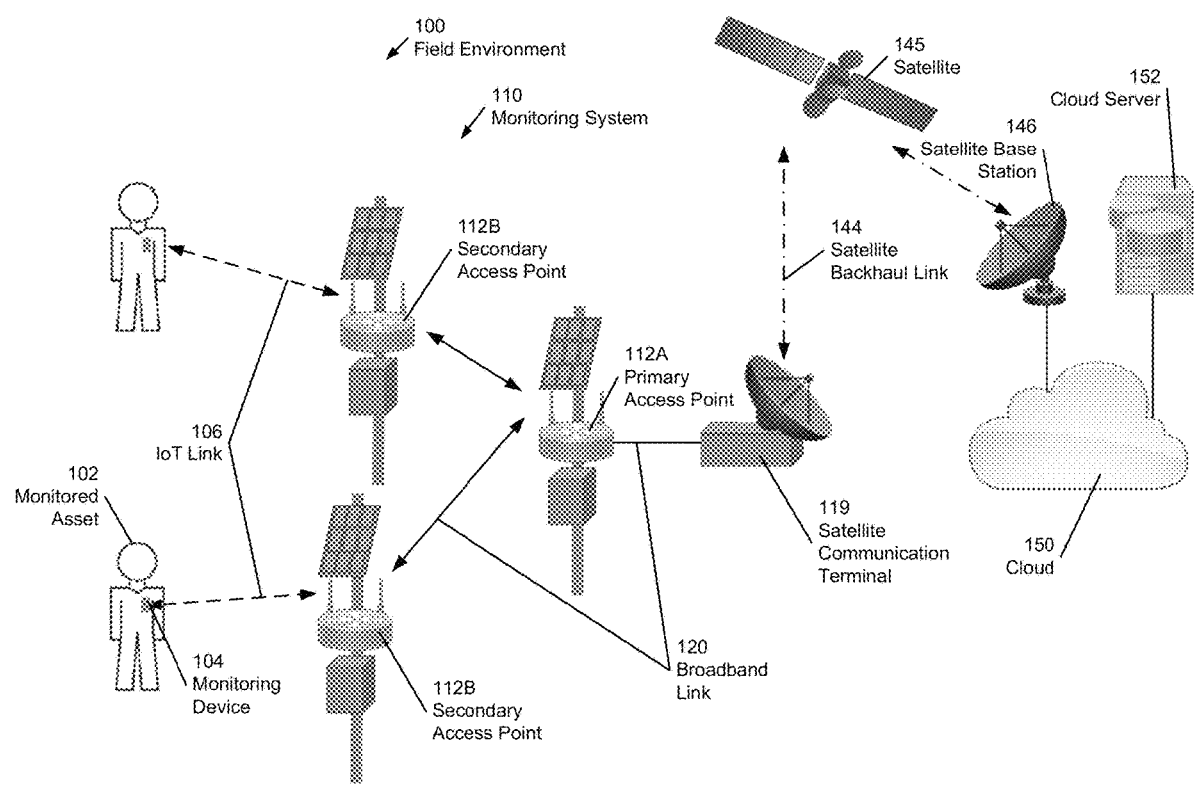

In one or more embodiments exemplified by FIG. 1C, an alternative configuration of the satellite communication system includes multiple access points 112A, 112B. Each access point 112 may have a limited range that may depend on the transmission power of the access point 112, but also on the transmission power of the monitoring devices 104 or other devices in the field environment 100. Accordingly, in order to extend the communication network across larger field environments 100, multiple access points 112A, 112B may be deployed at different locations in the environment. FIG. 1C shows a primary access point 112A and two secondary access points 112B. The primary access point 112A may directly interface with the satellite communication terminal 119. The secondary access points 112B may interface with the primary access point 112A using a broadband link 120 and therefore indirectly interface with the satellite communication terminal 119. The broadband link 120 may be a 10/100/1000 Mbps Ethernet link, optical link, or any other appropriate wired communication link without departing from the invention. Alternatively, the broadband link 120 may be part of a wireless local area network (WLAN) based on a Wi-Fi standard (e.g., an 802.11 standard), an Internet of Things (IoT) standard, or any other appropriate wireless communication link without departing from the invention.

By using additional access points 112, distributed across the field environment 100, larger areas may thus be covered by the satellite communication system. Those skilled in the art will appreciate that various configurations of multiple access points 112 are feasible without departing from the invention. For example, the satellite communication system may include any number of access points 112 to cover a field environment 100 of any size. For example, a daisy chain configuration of multiple access points 112 (i.e., tertiary access points may interface with the secondary access points, analogous to how the secondary access points interface with the primary access point) may increase the covered area further. In hybrid configurations, some access points 112 may be daisy-chained, whereas other access points 112 may directly interface with a hub 118 or the satellite communication terminal 119.

Figure 1D:
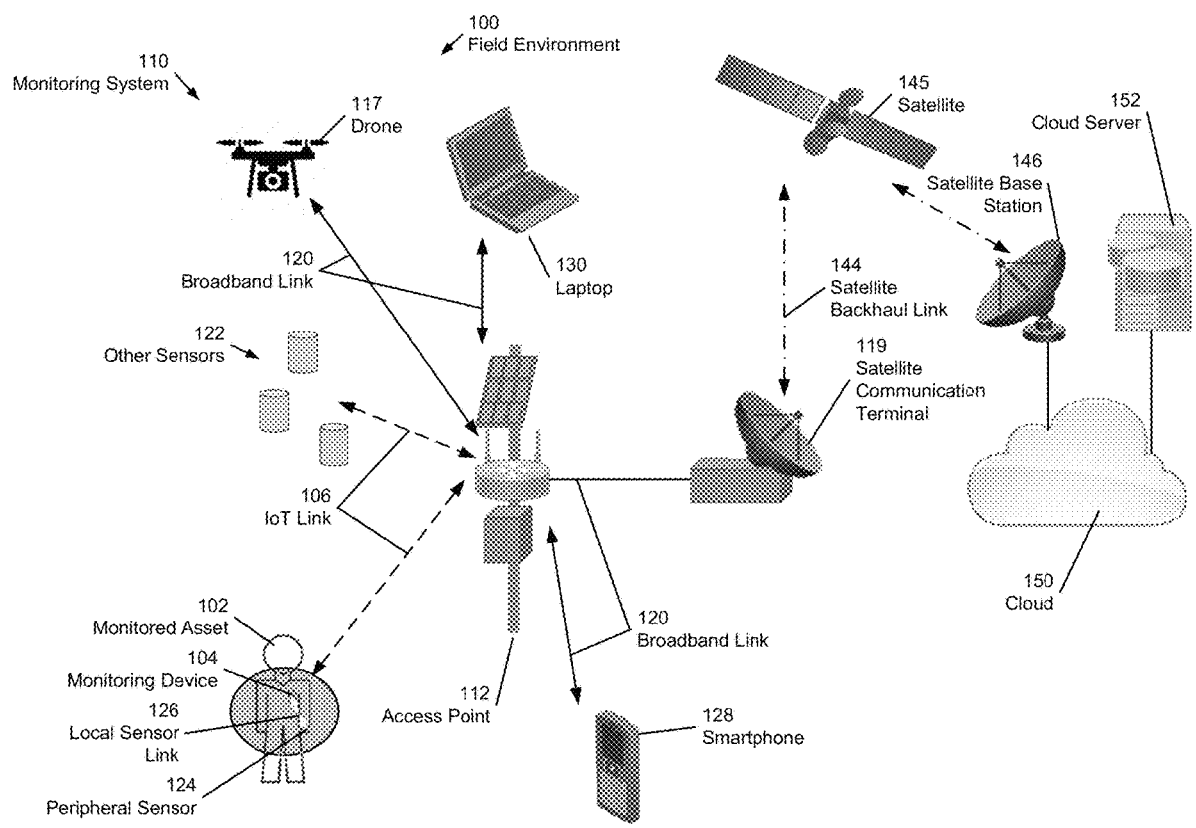

In one or more embodiments exemplified by FIG. 1D, an alternative configuration of the satellite communication system includes user devices. In one or more embodiments, the access point 112 is used to provide a user access to the communication network via a broadband link 120 to a smartphone 128 or laptop 130. Of course, the user devices may also connect directly to the satellite communication terminal 119 via a broadband link 120. Data that is provided by the monitoring devices 104 and/or monitoring device data that has been previously collected, processed and/or stored by the satellite communication terminal 119 may be obtained via a processing platform, described below with respect to FIG. 2F.

In one or more embodiments, a broadband link 120 may further be used to interface additional devices with access points 112 of the satellite communication system. For example, a drone 117 may communicate with the access point 112 via the broadband link 120 to relay real-time images, sensor information (e.g., LIDAR data, spectroscopic data, radiation data, survey information) to the communication network. The drone 117 may be in contact with various access points 112 depending on the drone's location in the field environment 100. The drone 117 may further not necessarily be in continuous contact with an access point 112 and may, instead, operate autonomously and may only require periodic contact with an access point 112. One or more drones 117 may be used to visually inspect the field environment 100. Multispectral cameras and/or mosaic photography may be used to monitor environmental conditions and/or activity in the field environment 100 using additional analytics software installed in the access point 112, a hub 118, or the satellite communication terminal 119.

In one or more embodiments, other sensors 122 that rely on a broadband link 120 or IoT link 106 to the access points 112 may be part of the satellite communication system as well. For example, cameras that are equipped with a Wi-Fi interface may be used to visually monitor certain areas of the field environment 100. Such cameras may include motion detection to detect activities including expected or desired activity, but also unexpected activity, such as intrusions. Additionally, or alternatively, cameras may provide still photos, video clips or live videos and/or alarms based on a detection of certain events in the videos or photos. Other sensors 122 may perform environmental measurements such as air temperature, humidity, or may be used to monitor equipment such as pumps, storage tanks, pipelines, etc.

In one or more embodiments, peripheral sensors 124 may be used to acquire additional measurements that may not be obtainable by a monitoring device 104 or a user device. Any number of peripheral sensors 124 may be used in conjunction with a monitoring device 104 or user device. A local sensor link 126 may transmit the measurements obtained by the peripheral sensor 124 to the monitoring device 104 or the user device, which may relay these measurements to one of the access points 112.

In one or more embodiments, other devices that rely on a broadband link 120 or IoT link 106 to the access points 112 may be part of the satellite communication system as well. The monitoring system is a non-limiting example of various different technologies connecting to a single communications network. However, the broadband link 120 may be used to connect one or more user devices for any purpose. For example, the user devices may be used for voice over IP (VOIP) calls, video calls, texting, general Internet access, intranet access, and/or for any other data service).

In a non-limiting example, a smart phone 128 may connect via broadband link 120 to satellite communication terminal 119 and connect via satellite backhaul link 144 and the cloud 150 to an external cellular network to conduct a telephone call. Similarly, satellite communication terminal 119 may connect two smart phones 128 within the field environment 100 to conduct a telephone call without the support of an existing or external cellular network. Furthermore, the satellite communication terminal 119 may handle the transition of a telephone call to an external cellular network if one of the smart phones 128 leaves the field environment 100 and enters the coverage range of the external cellular network. While the above example is described with respect to telephone calls and an external cellular network, the invention is not limited to this data service or type of external network. For example, any appropriate type of data service may be managed internally within the field environment 100 and/or externally with an external network outside of the field environment 100.

In one or more embodiments of the invention, the access point 112 is a two-tier access point equipped with a first tier broadband communication interface and a second tier narrowband communication interface. The first tier broadband communication interface provides the broadband link 120 and the second tier narrowband interface provides the IoT link 106. While the narrowband link may provide coverage of a comparatively large area at a reduced data rate that may be particularly suitable for monitoring devices 104 and other sensors 122, the broadband link 120 may provide coverage of a comparatively smaller area at a higher data rate that may be suitable to serve other devices such as laptops 130, smartphones 128, or other broadband equipment, including drones 117, cameras (not shown), etc. The broadband link 120 may further be used to establish a mesh network with other access points 112, as previously shown in FIG. 1C. In one or more embodiments, the satellite communication system includes a three-tier network that, in addition to the two tiers of the access point 112, includes a third tier formed by the local sensor link 126, as previously described.

Figure 1E:
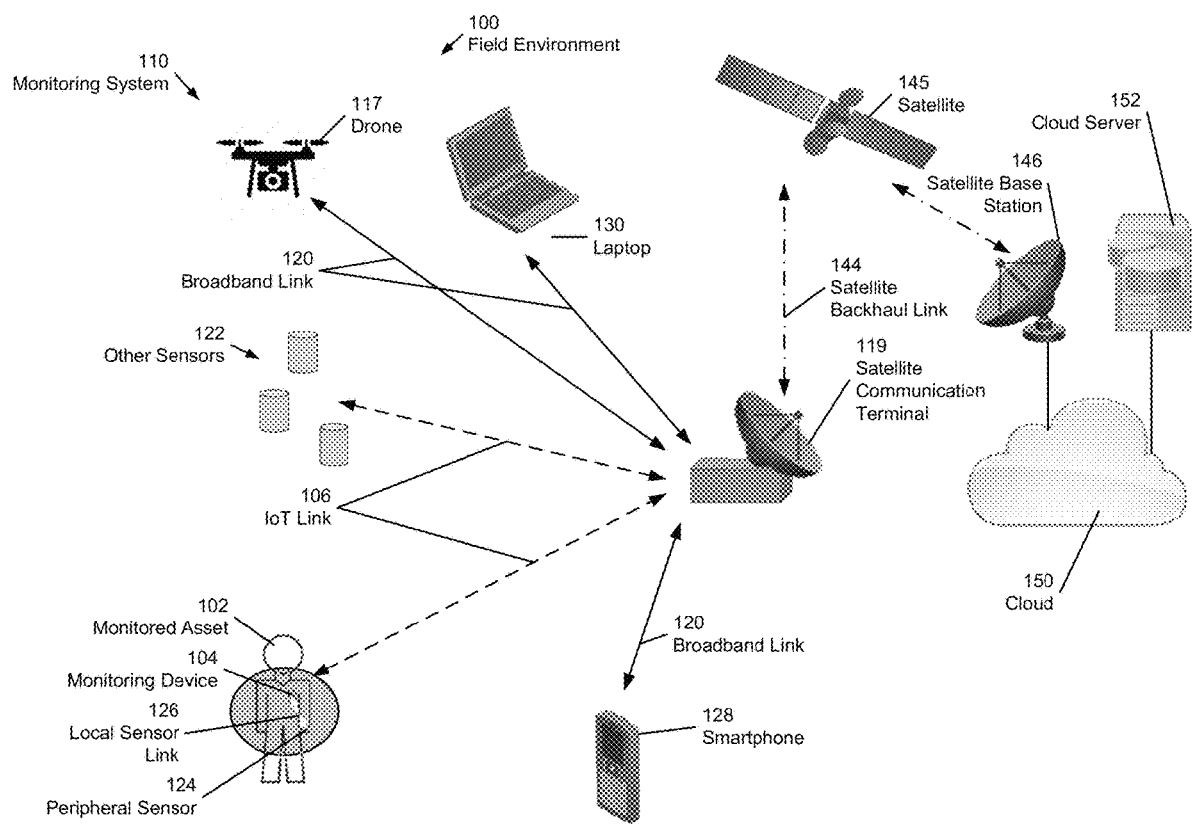

In one or more embodiments exemplified by FIG. 1E, the satellite communication terminal 119 may directly connect with the various devices in the field environment 100 via broadband links 120 or IoT links 106. The satellite communication terminal 119 is a communications network in a box that may independently create and maintain a one-, two-, or three-tier network described above. Intervening devices (e.g., an access point 112 or a hub 118) merely supplement the networking range, capacity, or capabilities of the satellite communication terminal 119.

Figure 1F:
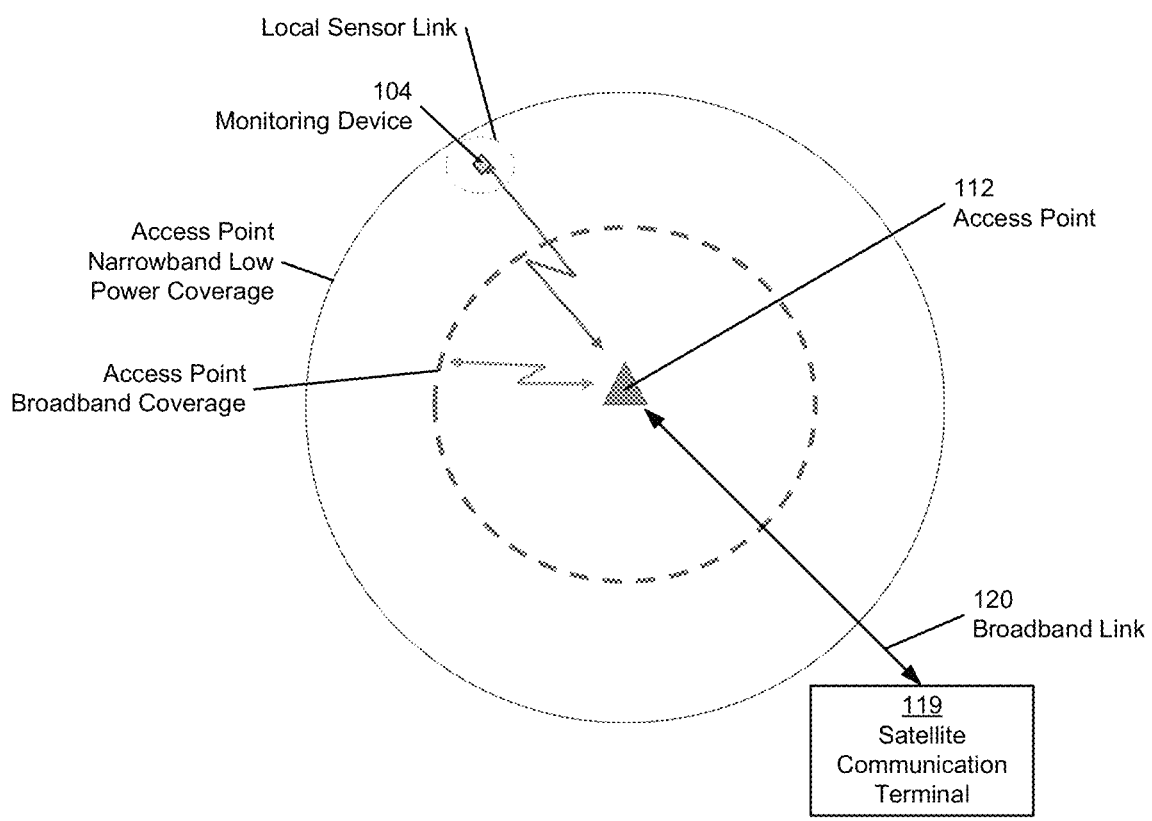

FIG. 1F shows an exemplary radio signal coverage of a satellite communication system comprising a satellite communication terminal 119 connected to a single access point 112 by a wired broadband link 120. A broadband coverage region of the access point 112, denoted by a dashed circle, surrounds the access point 112. Within the broadband coverage region, devices that require a broadband link 120 may be installed. A larger narrowband low power coverage region of the access point 112, denoted by the solid circle, surrounds the access point 112. While less data may be transmitted using an IoT link 106 (i.e., the local sensor link arrow), the IoT link 106 may require less power and may be feasible over longer distances, in comparison to a broadband link 120. For example, a battery-powered device (e.g. a monitoring device 104) may use the IoT link 106 rather than the broadband link 120 to conserve power. Those skilled in the art may appreciate that the areas that receive broadband and narrowband coverage depend on various factors, including the transmission power of the components involved in data transmissions, the types of antennas being used, terrain features, etc. Thus, in one or more embodiments, the local network within the field environment 100 may comprise only wired communication links or a mixture of wired and wireless communication links.

Figure 1G:
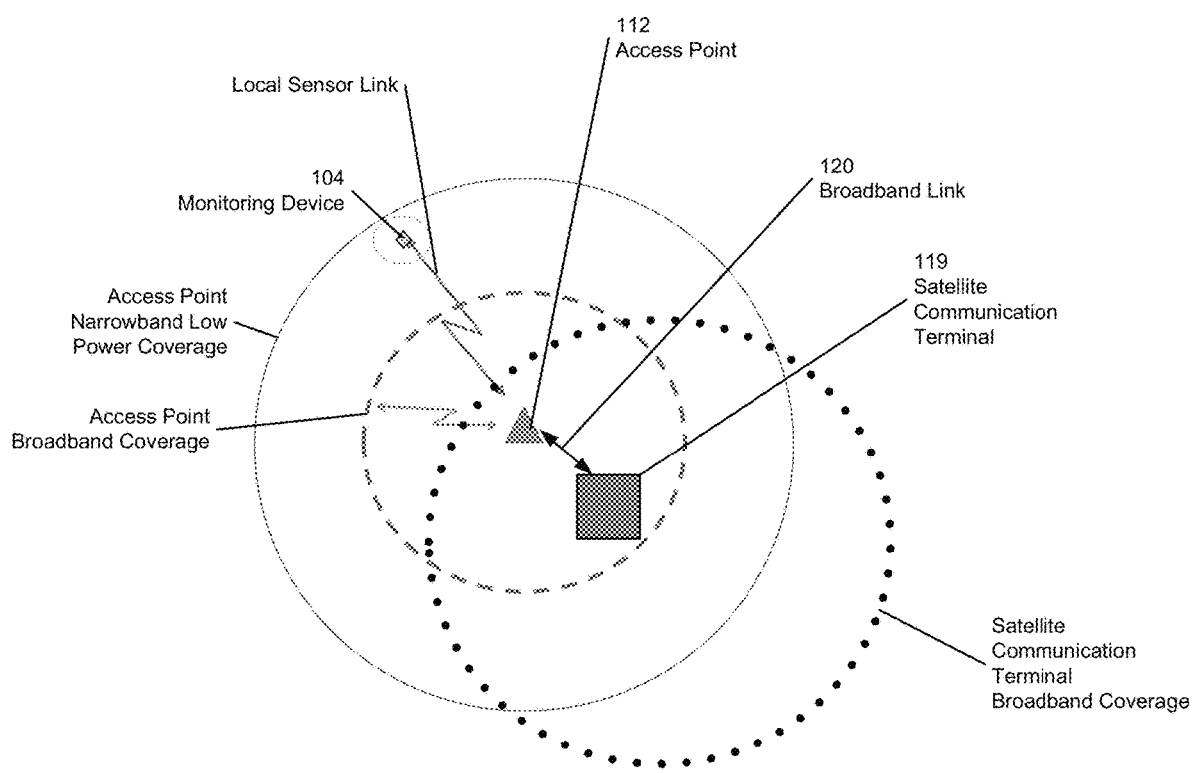

FIG. 1G shows an alternative radio signal coverage of a satellite communication system comprising a satellite communication terminal 119 connected to a single access point 112 by a wireless broadband link 120. A satellite communication terminal broadband coverage region, denoted by a dotted circle, surrounds the satellite communication terminal 119. Because the access point broadband coverage region and satellite communication terminal broadband coverage region overlap both devices, the access point 112 and satellite communication terminal 119 may support a wireless broadband link 120. Thus, in one or more embodiments, the local network within the field environment 100 may comprise only wireless communication links.

Figure 1H:
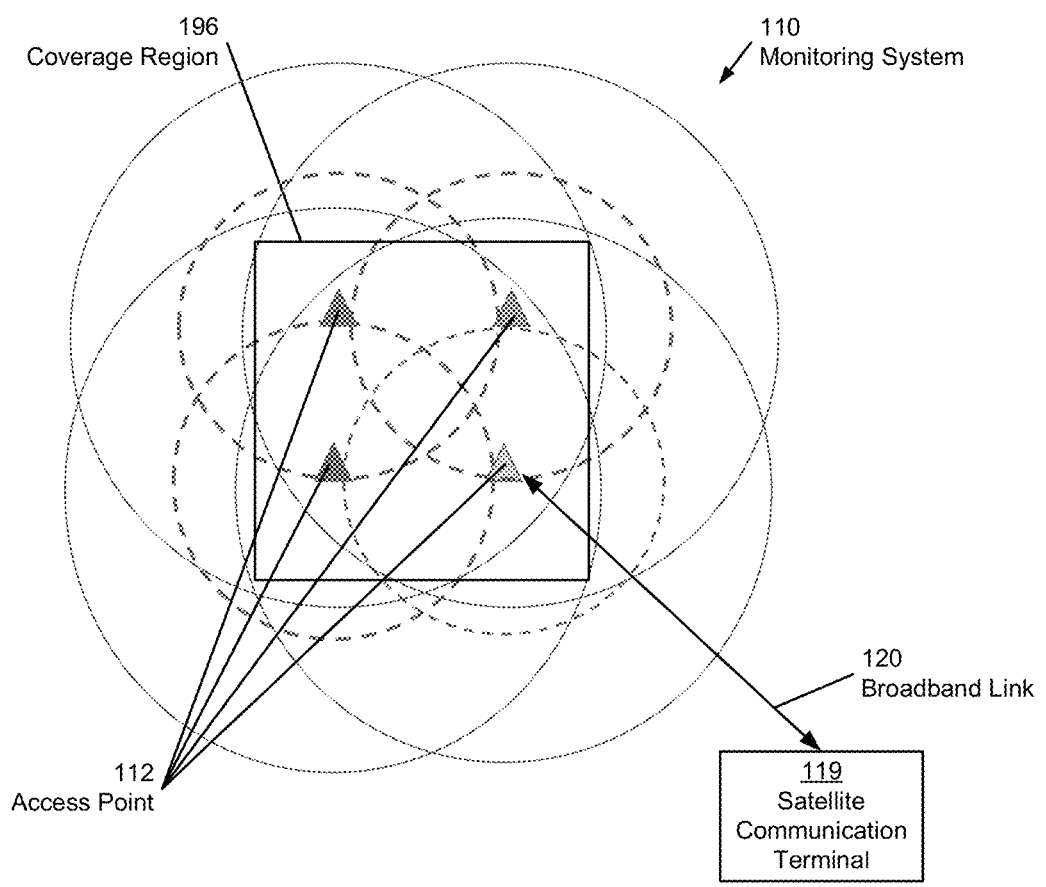

FIG. 1H shows an exemplary radio signal coverage of a satellite communication system comprising a satellite communication terminal 119 connected to a network of four access points 112. In the shown configuration, the access points 112 are spaced such that there is significant overlap between the broadband coverage (dashed circles) provided by the different access points 122, but also between the narrowband coverage (solid circles) provided by the different access points 122. Using the set of access points 122, a coverage region 196 is entirely covered by narrowband signals of at least three access points. In one or more embodiments, overlap of narrowband coverage provided by multiple access points 112 is desirable. Specifically, in a coverage region 196 where a device receives narrowband coverage by at least three narrowband signals (e.g., IoT signals), the signals of the device, received by at least three access points may be used to determine the location of the device, thus enabling, for example, location tracking of the device. The location of the device may be determined using time difference of arrival (TDOA) methods. Accordingly, location tracking using TDOA methods may be performed in the coverage region 196 in which at least three access points may receive transmissions sent by the device. TDOA positioning may provide moderately accurate location information (e.g. with an accuracy of approximately 30-75 m), although the accuracy may deteriorate when the quality of the reception at one or more of the access points 112 is poor. The measurement accuracy may, however, not be strongly affected by the presence of buildings and foliage. Alternatively, received signal strength indication (RSSI) positioning may provide location information with limited accuracy, (frequently no more accurate than approximately 75 m), and may allow positioning even under difficult conditions (e.g., when fewer than three access points are available). Further, if equipped with a global positioning system (GPS) receiver, the device's location may be determined using the GPS receiver. GPS positioning does not rely on the exchange of signals with access points 112 and may thus be available anywhere, even outside the coverage region 196, although power requirements may be significantly higher when relying on GPS. Further, GPS signals may be blocked by structures, foliage, etc. However, the accuracy is typically higher than the accuracy of the TDOA and RSSI methods.

Accordingly, to enable energy efficient location determination in certain regions, access points 112 may be strategically placed to have overlapping coverage regions, thereby not requiring the use of power consuming GPS positioning. In regions where TDOA based location services are desired, a dense grid of access points with a high degree of overlap may be installed to ensure that overlapping coverage is provided by at least three access points, whereas a sparse grid of access points may be installed in other regions. In these other regions, less accurate RSSI positioning may be used, or if an accurate location is required, GPS positioning may be used.

Figure 1I:
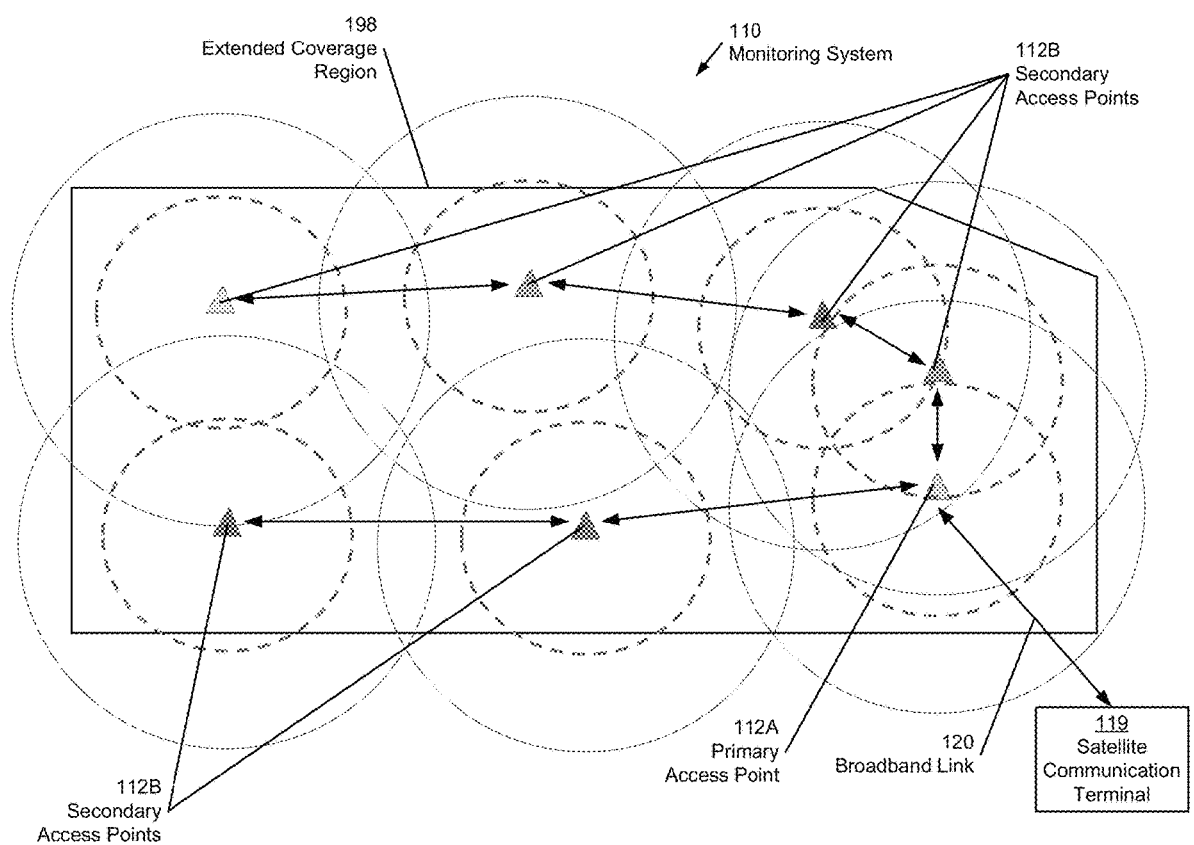

FIG. 1I shows an exemplary radio signal coverage of a satellite communication system comprising a satellite communication terminal 119 connected to a network of multiple daisy-chained access points 112A, 112B. To cover large areas effectively, access points may need to be deployed strategically to cover the field environment 100.

The configuration shown in FIG. 1I uses a primary access point 112A that directly interfaces with the satellite communication terminal 119 and provides an interface to the secondary access points 112B. Using the daisy-chained set of access points 112A, 112B, a coverage region 198 is entirely covered by a narrowband signal (solid circles), while some areas are also covered by a broadband signal (dashed circles). In the exemplary configuration shown in FIG. 1I, the left part of the coverage region 198 is covered by sparsely placed access points and the broadband coverage regions are non-overlapping. In contrast, the right part of the coverage region 198 is covered by densely placed access points and the broadband coverage is overlapping, thus establishing a contiguous region with broadband signal coverage. Those areas may, thus, serve different purposes. For example, the left part may be used to monitor sensors that merely require a narrowband communication interface (e.g., weather sensors or monitoring devices for assets that do not require TDOA tracking). In contrast, the right part may be used for a drone surveillance that requires a continuous broadband signal. Those skilled in the art will appreciate that even though FIG. 1I shows the primary access point 112A interfacing directly with the satellite communication terminal 119, a hub 118 may be inserted as an intervening device to aid data processing and routing communications within the extended coverage region 198. Further, to provide coverage for even larger areas and/or for larger numbers of connected devices, additional access points 112 and/or additional hubs 118 may be deployed.

Figure 1J:
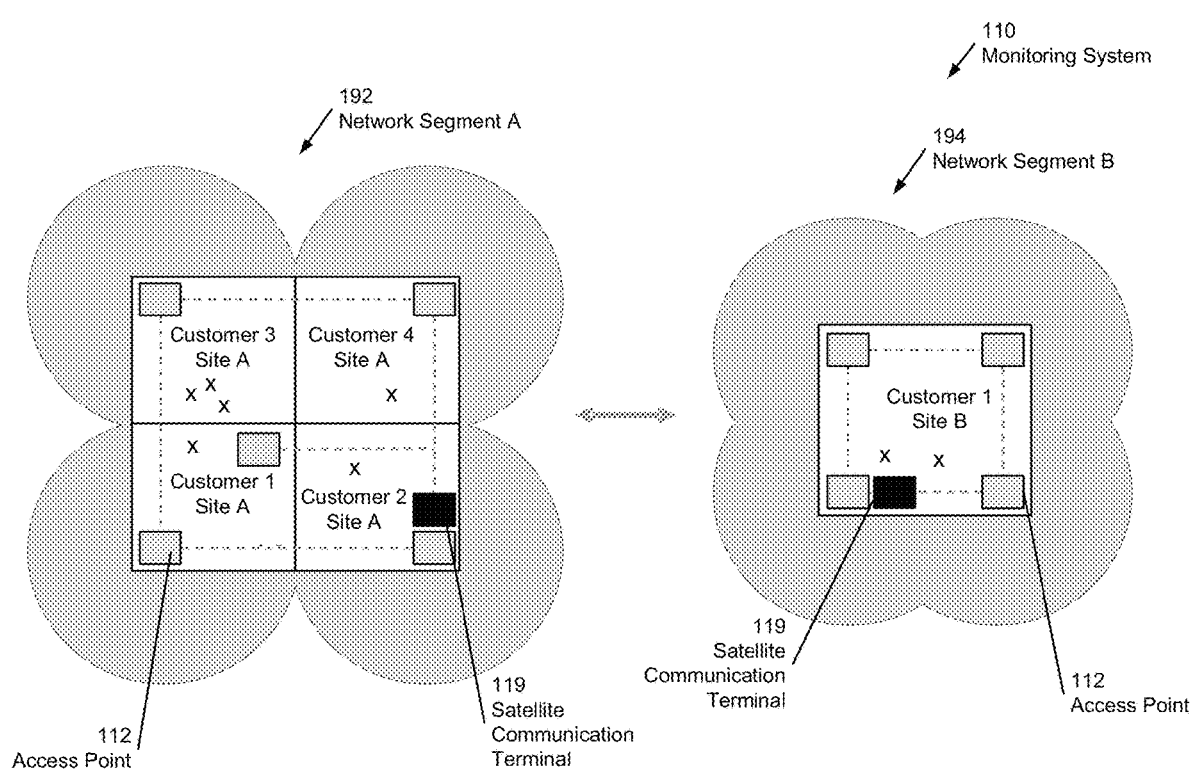

In one or more embodiments exemplified by FIG. 1J, the satellite communication system includes multiple network segments 192, 194. Each of the network segments 192, 194, is equipped with a satellite communication terminal 119 and multiple access points 112, providing broadband and/or narrowband network coverage. Both network segments may operate using the same communication protocols. Network segment A 192 is configured as a multitenant site (i.e., multiple customers are served by the network segment). Network segment B 194 is configured as a single tenant site.

Consider, for example, a satellite communication system installed at a remote oilfield facility that is occupied by multiple companies (e.g., an oil company and multiple oil and gas service companies). Assume that all of the companies require a satellite communication network to share data and information. Accordingly, the companies agree to have a common satellite communication system installed by a satellite service provider. Customer 1 is an oil company that owns the remote oilfield facility covered by network segment A and a headquarters covered by network segment B. Management staff of customer 1 are distributed across various sites of the remote oilfield facility but still need to communicate with each other and with headquarters. Customers 2-4 are different oil and gas service providers that operate different sites of the remote oilfield facility. Accordingly, network access between customers may be regulated and authorized by broadband services of the satellite communication terminal 119 to maintain confidentiality (e.g. firewalls) and track usage (e.g., monitor data caps) of and between the various customers. Broadband services are described below with respect to FIG. 2F.

The exemplary satellite communication system of FIG. 1J thus illustrates a multitenant, multisite satellite communication system, in accordance with one or more embodiments of the invention. Those skilled in the art will appreciate that satellite communication systems are fully scalable. For example, satellite communication systems may include any number of sites, any number of device, or any number of customers. Further, satellite communication systems, in accordance with one or more embodiments of the invention, may be globally distributed. For example, network segments A 192 and network segments B 194 may be on different continents. Network segments or sites may grow arbitrarily large, with any number of access points and/or devices. However, eventually a network segment or site with numerous devices may become congested, or the satellite communication terminal 119 of the network segment may be overwhelmed by the incoming volume of data. In such a scenario, the network segment may be split into two or more separate network segments, each with its own satellite communication terminal 119.

Figure 2A:
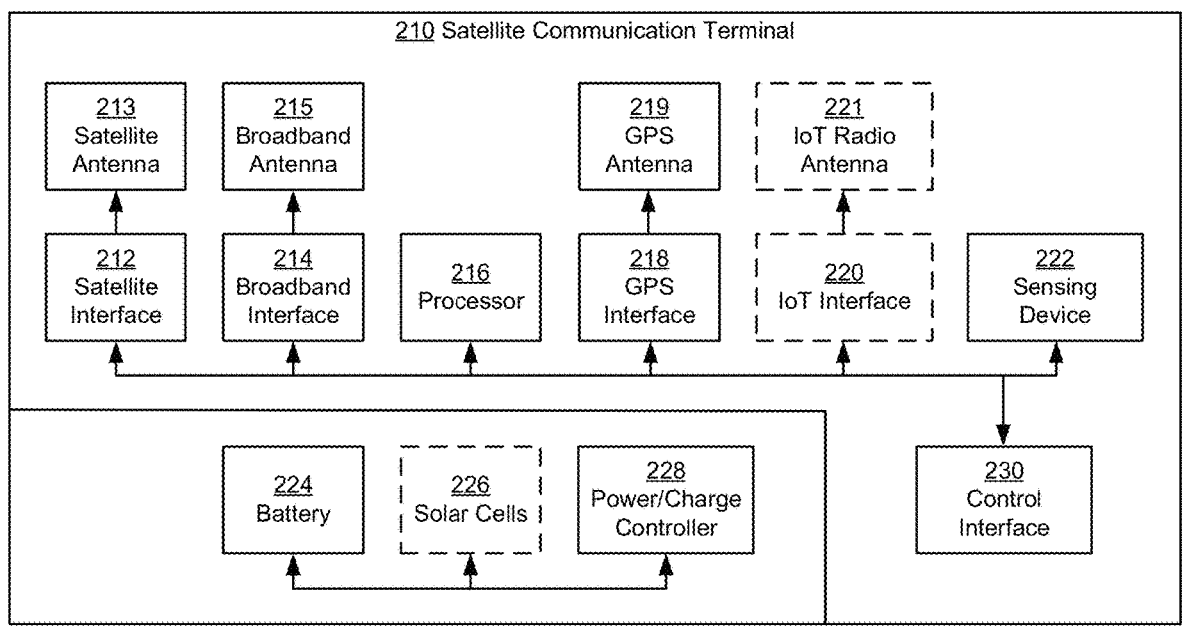
FIGS. 2A-2F show a satellite communication terminal, a satellite antenna, a satellite communication terminal-cloud configuration, and a processing platform, in accordance with one or more embodiments of the invention.

FIG. 2A shows a satellite communication terminal, in accordance with one or more embodiments of the invention. The satellite communication terminal 210 may be equipped with a mounting or attachment element that is application specific. For example, the satellite communication terminal 210 may be permanently or temporarily bolted to an equipment, installation, vehicle, or building in the field environment 100. Those skilled in the art will appreciate that the satellite communication terminal 210 is suitable for many applications and may thus be adapted to include mounting elements as needed. The satellite communication terminal 210 may further include several other components, each of which is described below, implemented using hardware, software, or a combination of hardware and software.

The satellite communication terminal 210 comprises a satellite interface 212 (i.e., modem) that manages communication over one or more satellite backhaul links 144. The satellite interface 212 may control a satellite antenna 213 in conjunction with a processor 216. Further, the satellite interface 212 may perform any necessary operations to filter, aggregate, compress, encrypt or otherwise process data that is sent or received (i.e., exchanged) over a satellite backhaul link 144. The satellite antenna 213 creates and maintains one or more satellite backhaul links 144 with one or more satellites 145. Various examples and embodiments of the satellite antenna 213 are described below with reference to FIGS. 2B-2D.

The satellite communication terminal 210 comprises a broadband interface 214 (i.e., modem) that manages communication over one or more broadband links 120 in the field environment 100. The broadband interface 214 may comprise one or more terminals to establish a wired broadband link 120 in the field environment 100. The broadband interface 214 may control one or more broadband antennas 215 in conjunction with a processor 216 to establish a wireless broadband link 120 in the field environment 100. Further, the broadband interface 214 may perform any necessary operations to filter, aggregate, compress, encrypt or otherwise process data that is sent or received (i.e., exchanged) over a broadband link 120.

The broadband interface 214 may support mesh, point-to-point, and multi-point connections. The broadband interface 214 may be based on a Wi-Fi standard (e.g., 802.11 interface) using one or more radio bands (e.g., the 2.4 and/or 5 GHz radio bands), IoT standard, or any other appropriate wireless communication interface without departing from the invention. Alternatively, the broadband interface 214 may be a 10/100/1000 Mbps Ethernet interface, optical interface, or any other appropriate wired communication interface without departing from the invention.

The satellite communication terminal 210 comprises a processor 216 that may be part of a computing system that controls the satellite communication terminal 210, as described below with reference to FIG. 8. The processor 216, with associated memory and storage devices (not shown), controls the various components of the satellite communication terminal 210. For example, the processor 216 may control a beam direction of the satellite antenna 213, as described below with respect to FIGS. 2B-2D. Furthermore, the processor 216 may gather and process data from one or more of the sensing devices 222 to control a beam direction of the satellite antenna 213. The processor 216 may perform broadband services on data exchanged with a device in the field environment 100 over the broadband link 120 and the satellite backhaul link 144. Further, the processor 216 may provide access to the exchange data to the device (e.g., via a processing platform 270 described below with reference to FIG. 2F).

The satellite communication terminal 210 comprises a Global Positioning System (GPS) interface 218 that manages GPS information. The GPS interface 218 may control a GPS antenna 219 in conjunction with the processor 216. Further, the GPS interface 214 may perform any necessary operations to filter, aggregate, compress, encrypt or otherwise process data that is received by GPS antenna 219. In other words, the GPS antenna and GPS interface may provide location information of the satellite communication terminal 210 to the processor 216. The processor may use the location information to control the beam direction of the satellite antenna 213, as described below with respect to FIG. 8. When not in use, the GPS interface 218 may be in a deep sleep mode or completely powered down.

The satellite communication terminal 210 may optionally comprise an IoT interface 220 that manages communication over one or more IoT links 106 in the field environment 100. The IoT interface 220 may comprise one or more terminals to establish a wired IoT link 106 in the field environment 100. The IoT interface 220 may control an IoT radio antenna 221 in conjunction with the processor 216. Further, the IoT interface 220 may perform any necessary operations to filter, aggregate, compress, encrypt or otherwise process data that is sent or received (i.e., exchanged) over an IoT link 106. The IoT radio antenna 221 creates and maintains one or more wireless IoT links 106 with various IoT devices in the field environment 100.

The IoT interface 220 may be configured to communicate with one or more access points 112 or other devices (e.g., other sensors 122, a smartphone 128, or a laptop 130) in the field environment 100, using an IoT protocol such as LoRa. Communications may include, but are not limited to, the sending/receiving of a time base from one or more access points 112 or devices in the field environment 100, the receiving of a configuration, the receiving of a firmware, the sending/receiving of data, and/or the sending/receiving of device status data, such as errors, battery level, etc. The activity of the IoT interface 220 may be optimized to minimize power consumption. For example, the IoT interface 220 may be in a deep sleep mode whenever no transmission of data is required.

The satellite communication terminal 210 may comprise one or more sensing devices 222 that obtain various information about the satellite communication terminal 210 (e.g., position, orientation, internal temperature, ambient temperature, ambient pressure, altitude, humidity, etc.). These sensing devices 222 may include, but are not limited to a digital level, a magnetometer, an accelerometer, a thermometer, a barometer, an altimeter, a hygrometer, or any appropriate sensing device. The one or more sensing devices 222 may be used to determine the location of the satellite communication terminal 210 when other, more power efficient, methods for determining the location (e.g., GPS, TDOA, and/or RSSI) are not available or the previously acquired location data is not sufficiently accurate. The one or more sensing devices 222 may be interfaced with the processor 216 using digital and/or analog interfaces and may have a wired, wireless, optical, or any appropriate interface to the satellite communication terminal 210. When not in use, the sensing device 222 may be in a deep sleep mode or completely powered down.

In one or more embodiments, the components of the satellite communication terminal 210 are battery powered. The battery 224 may be a rechargeable or a non-rechargeable battery that may or may not be replaceable. The battery 224 may be selected to power the components of the satellite communication terminal for a specified duration, e.g., for multiple months or years. If the battery 224 is rechargeable, a power/charge controller 228 may control the charging of the battery 224 from optional solar cells 226 or other external power sources, such as inductively provided power. The power/charge controller 228 may further communicate battery status information to the processor 216. In addition, the battery level may directly govern the operation of the satellite communication terminal 210. For example, when a low battery level is detected, the communication frequency may be reduced, certain sensors may be deactivated, etc. In one or more embodiments, external power supplies (not shown) may be used if the satellite communication terminal 210 is stationary.

The satellite communication terminal 210 comprises a control interface 230 that may include analog or digital inputs/outputs, including communication bus systems, and/ or relays, motors, or any other equipment that may be used to control functions of the satellite communication terminal 210. Those skilled in the art will appreciate that the control interface may be any appropriate interface used to control any function of the satellite communication terminal 210.

Figure 2B:
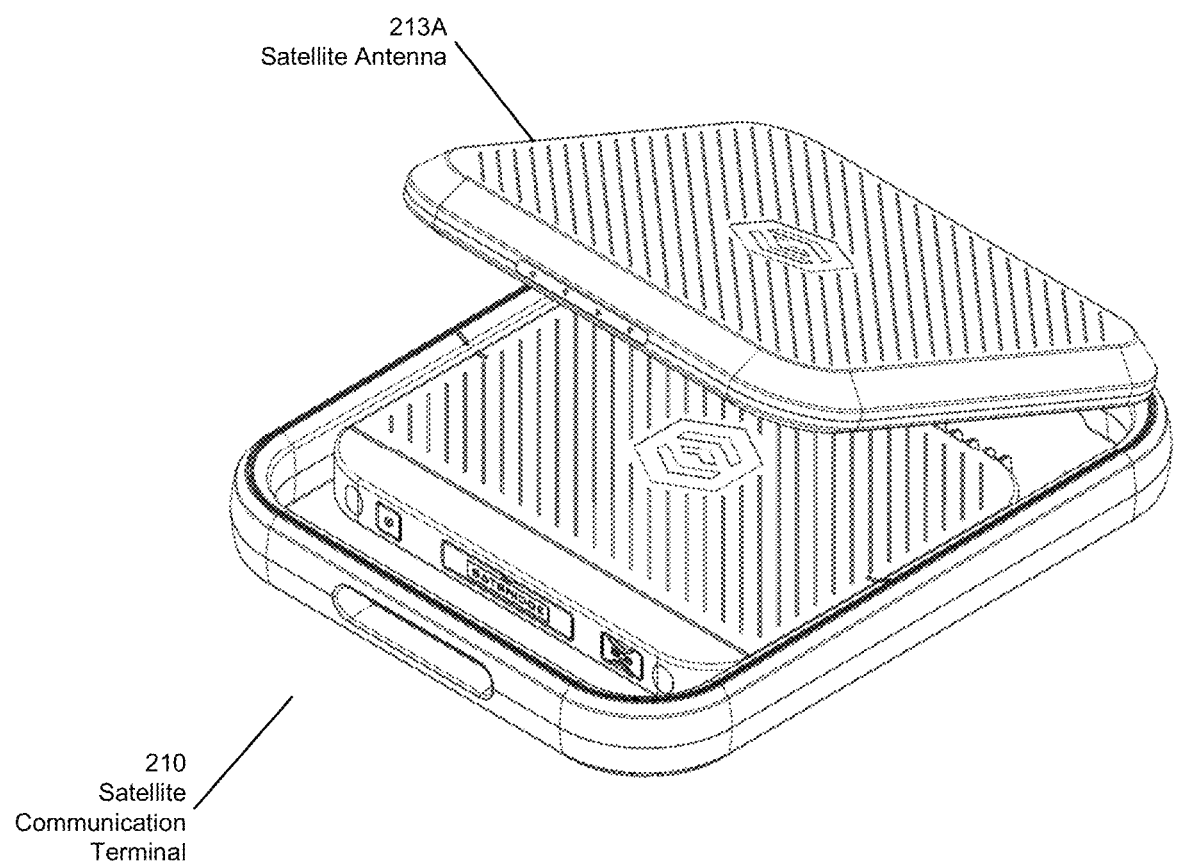

FIG. 2B shows a satellite communication terminal and satellite antenna, in accordance with one or more embodiments of the invention. The satellite antenna 213A may be a flat antenna that is oriented with respect to the satellite communication terminal 210 by a hinging connection on one edge. However, any appropriate hardware and electrical connection between the satellite communication terminal 210 and the satellite antenna 213 may be used. For example, the satellite antenna 213 may be detachable with an independent stand and cables to exchange signals and/or power with the satellite communication terminal 210.

In one or more embodiments, the satellite communication terminal 210 is configured for communications on the pause (COTP). In other words, the satellite communication terminal 210 comprises a satellite antenna 213 that maintains the satellite backhaul link 144 while the satellite communication terminal 210 is stationary (e.g., temporarily placed on a worksurface or permanently installed on a mounting surface). For example, a user may enter the field environment 100 and setup a stationary workstation with a satellite communication terminal 210.

In one or more embodiments of a COTP satellite communication terminal 210, the satellite antenna 213A is a flat antenna with a relatively fixed beam direction. The beam direction of the satellite antenna 213 may be defined as a direction of highest signal intensity, but is not limited to this definition. For example, the beam direction may be an angular range with a minimum acceptable signal level (e.g., +/−20 degree working range). In one or more embodiments, the beam direction of the satellite antenna 213A may be fixed by a radiation pattern inherent to the physical components of the antenna (e.g., size, distribution, or phase offset of one or more antenna elements 213B).

In one or more embodiments, the satellite communication terminal 210 may connect with a satellite 145 in a geostationary orbit. By rotating the satellite communication terminal 210 and adjusting the orientation of the satellite antenna 213A, the beam direction of the satellite antenna 213A may be manually steered within a predetermined angular range of the geostationary satellite 145. In this case, the satellite backhaul link 144 may be established and maintained without further interaction until the user moves the satellite communication terminal 210.

Figure 2C:
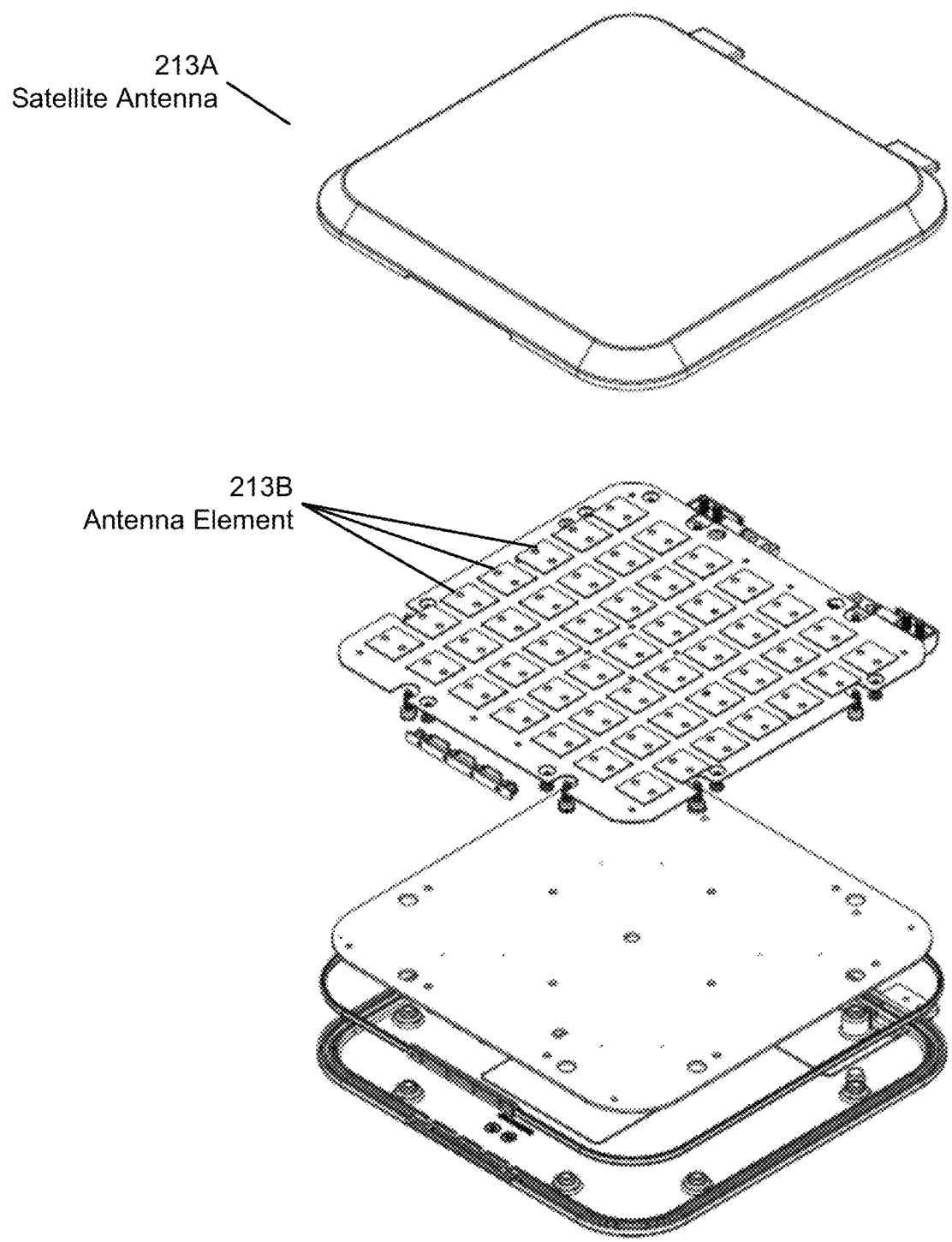

FIG. 2C shows an exploded view of a satellite antenna, in accordance with one or more embodiments of the invention. The satellite communication terminal 210 may include a flat satellite antenna 213A with a plurality of antenna elements 213B. In one or more embodiments, the antenna elements 213B may be disposed in a regular array (e.g., a rectilinear array), but the configuration of antenna elements 213B is not limited to any particular regular or irregular pattern. Furthermore, the antenna elements 213B may be grouped or independently controlled to achieve any appropriate radiation profile, as discussed below in detail with respect to FIGS. 3-7.

In one or more embodiments, the satellite communication terminal 210 is configured for communications on the move (COTM). In other words, the satellite communication terminal 210 comprises an antenna 213 that maintains the satellite backhaul link 144 while the satellite communication terminal 210 is in motion. For example, a user travelling across the field environment 100 may setup a mobile workstation (e.g., in a car, boat, or airplane) with a satellite communication terminal 210.

In one or more embodiments of a COTM satellite communication terminal 210, the satellite antenna 213A is a flat antenna comprising a plurality of antenna elements 213B that function as a phased antenna array. The beam direction of the satellite antenna 213A may be varied by manipulating the collective radiation profile of the plurality of antenna elements 213B (i.e., beam-forming). After aligning the beam direction by the beam-forming, the satellite communication terminal 210 may establish a satellite backhaul link 144 with a satellite 145 in a geostationary orbit. The satellite communication terminal 210 maintains the satellite backhaul link 144 by redirecting the beam direction to track the stationary satellite 145 in the sky as the satellite communication terminal 210 moves around the field environment 100.

Alternatively, the satellite communication terminal 210 may establish a satellite backhaul link 144 with a satellite 145 in a non-geostationary orbit. The satellite communication terminal 210 maintains the satellite backhaul link 144 by redirecting the beam direction with beam-forming to track the moving satellite 145 in the sky as the satellite communication terminal 210 moves around the field environment 100. Those skilled in the art will appreciate that a beam-forming satellite antenna 213A may be used for both COTP and COTM applications in conjunction with a geostationary or non-geostationary satellite 145.

Figure 2D:
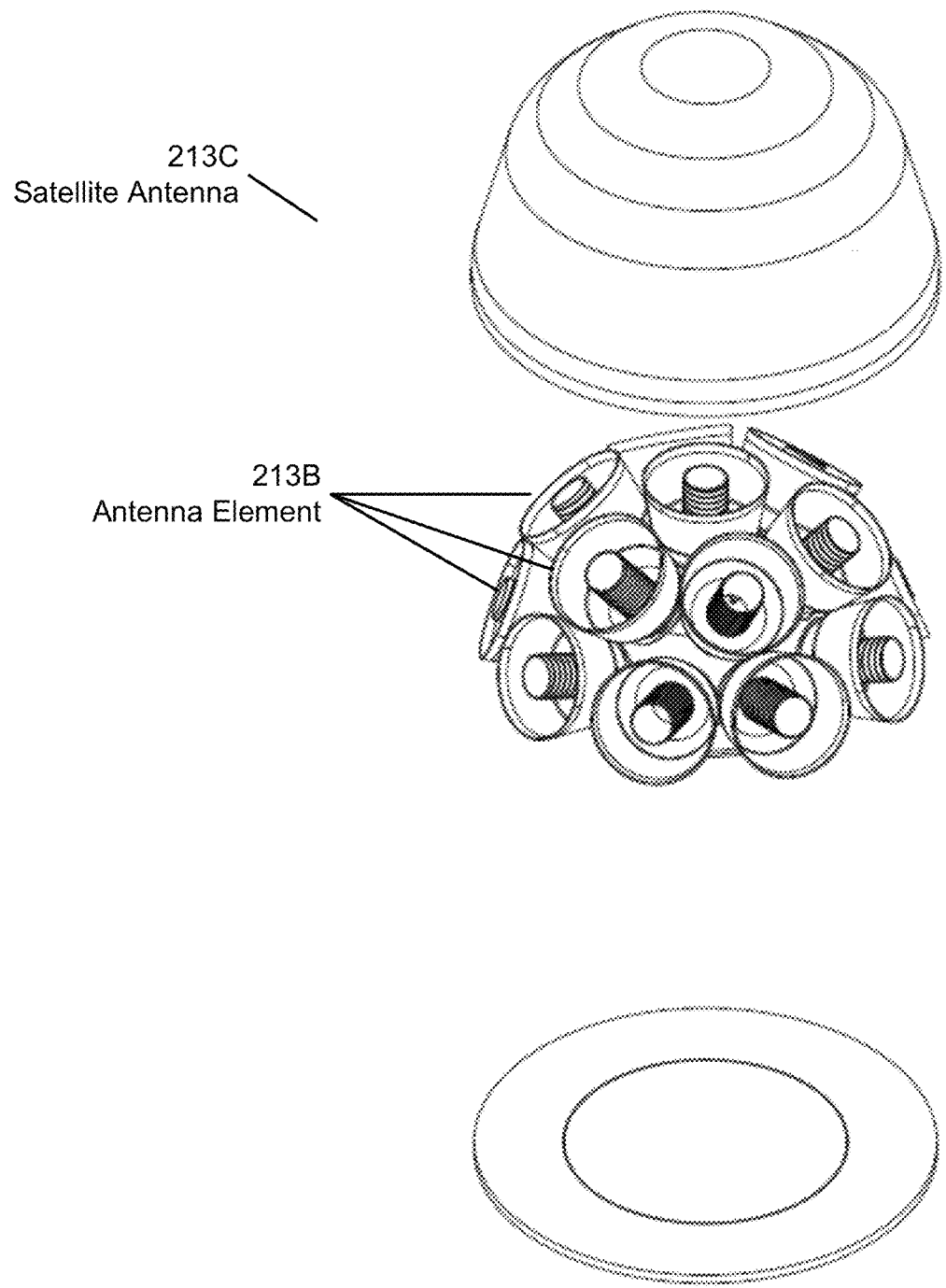

FIG. 2D shows an exploded view of a satellite antenna, in accordance with one or more embodiments of the invention. The satellite communication terminal 210 may include a satellite antenna 213C with a plurality of antenna elements 213B oriented in different directions. In one or more embodiments, the satellite antenna 213C may comprise a base and a cover to protect the antenna elements 213B from hostile conditions (e.g., broad temperature ranges, wind, rain, dust, insects and mechanical stress).

In one or more embodiments, the satellite antenna 213C may be used for both COTP and COTM applications in conjunction with a geostationary or non-geostationary satellite 145. The satellite interface 212 of the satellite communication terminal 210 may automatically select one or more antenna elements 213B of the plurality of antenna elements 213B that are optimally aligned with the target geostationary or non-geostationary satellite 145. Furthermore, the satellite antenna 213C requires minimal setup because the plurality of antenna elements 213B may be distributed to provide relatively uniform coverage in a wide range of directions, regardless of the orientation of the satellite communication terminal 210.

Figure 2E:
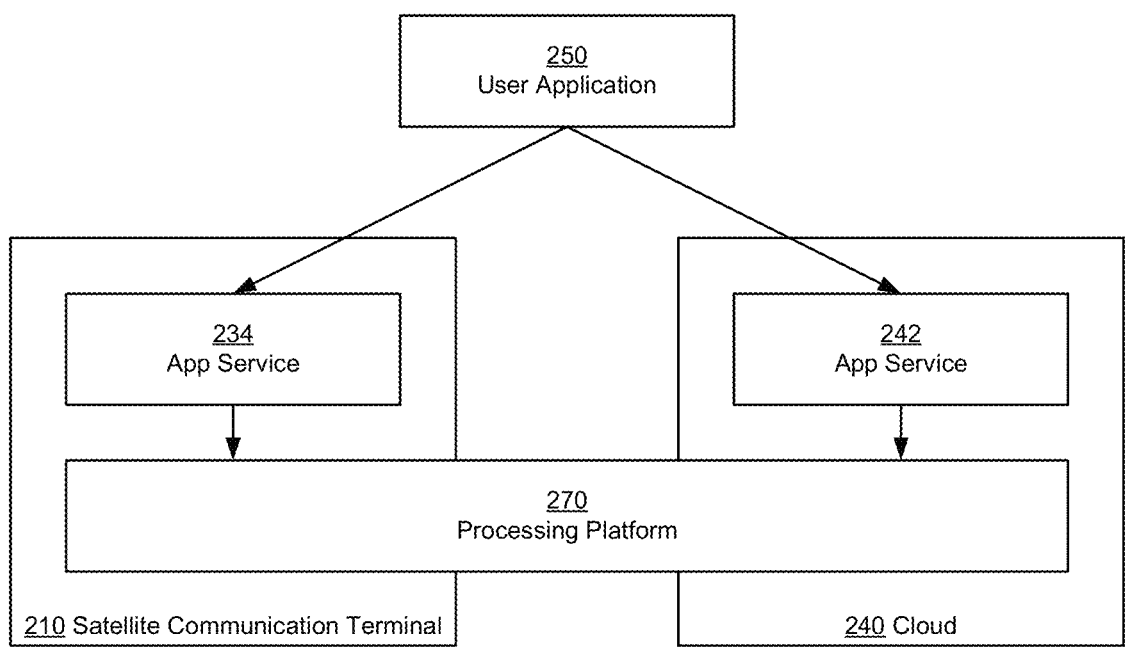

FIG. 2E shows a satellite communication terminal-cloud configuration, in accordance with one or more embodiments of the invention. The satellite communication terminal-cloud configuration includes the satellite communication terminal 210, the cloud 240, and the user application 250. A processing platform 270, jointly executing on the satellite communication terminal 270 and in the cloud 240 in a distributed manner, provides back end-support for the various devices in the field environment 100, as further described with reference to FIG. 2F. A user application 250 may be relied upon by a user to access the processing platform 270 via the satellite communication terminal 210 and/or via the cloud 240. Each of these components is subsequently described.

In one or more embodiments, services available through the processing platform 270 may include providing/exchanging data between devices in the field environment 100 or enabling the user to interact with the devices in the field environment 100, etc. The processing platform 270 may be accessed by a user using the user application 250, which may be executed on a computing device such as a smartphone 128 or a laptop 130. The user application 250 may provide a user interface that enables the user to access the processing platform 270. The user application 250 may include alert displays, status messages, data visualization capabilities, control and configuration capabilities (e.g., satellite antenna positioning and orientation instructions described below with respect to FIG. 8), but is not limited these functionalities. The user application 250 may further provide data entry fields to configure the services performed by the processing platform 270 (e.g., setting authorization parameters, validating authorization, etc.), specialized control interfaces (e.g., to control a drone 117), voice over IP (VoIP) and/or push to talk interfaces and other communication interfaces that are supported by the broadband links 120 provided by the access points 112. Alternative implementations of the user application 250 may operate on other devices in the field environment (e.g., on an audio alert device, a laptop 130, or a monitored device 104).

Depending on whether the user application 250 accesses the processing platform 270 via the satellite communication terminal 210 (i.e., part of a local network in the field environment 100) or via the cloud 240 (i.e., part of an external network connected to the cloud 240) the user application 250 may interface with the processing platform via the app service 234 of the satellite communication terminal 210 or via the app service 232 of the cloud 240. When a user is located in the field environment (e.g., directly connected to an access point 112 or the satellite communication terminal 210), accessing the processing platform 270 may be particularly low-latency because the interaction of the user's device with the satellite communication terminal 210 is local.

The satellite communication terminal 210 includes a computing device configured to execute the app service 234 to interface with one or more access points 112, the cloud 240, and the device that executes the user application 250. In one or more embodiments, the computing device of the satellite communication terminal 210 may be an embedded system that includes all components of the computing device on a single printed circuit board (PCB), or a system on a chip (SOC), i.e., an integrated circuit (IC) that integrates all components of the computing device into a single chip. The computing device may include one or more processor cores, associated memory (e.g., random access memory (RAM), cache memory, flash memory, etc.), one or more wired or wireless network interfaces (e.g., an Ethernet interface, an optical interface, a Wi-Fi interface, a Bluetooth interface, a cellular interface, etc.), and interfaces to storage devices, input and output devices, etc. The computing device of the satellite communication terminal 210 may further include one or more storage device(s) (e.g., a hard disk, an optical drive such as a compact disk (CD) drive or digital versatile disk (DVD) drive, flash memory, etc.), and numerous other elements and functionalities. In one or more embodiments, the computing device includes an operating system that may include functionality to execute the methods further described below. Those skilled in the art will appreciate that the invention is not limited to the aforementioned configuration of the computing device of satellite communication terminal 210.

Figure 9:
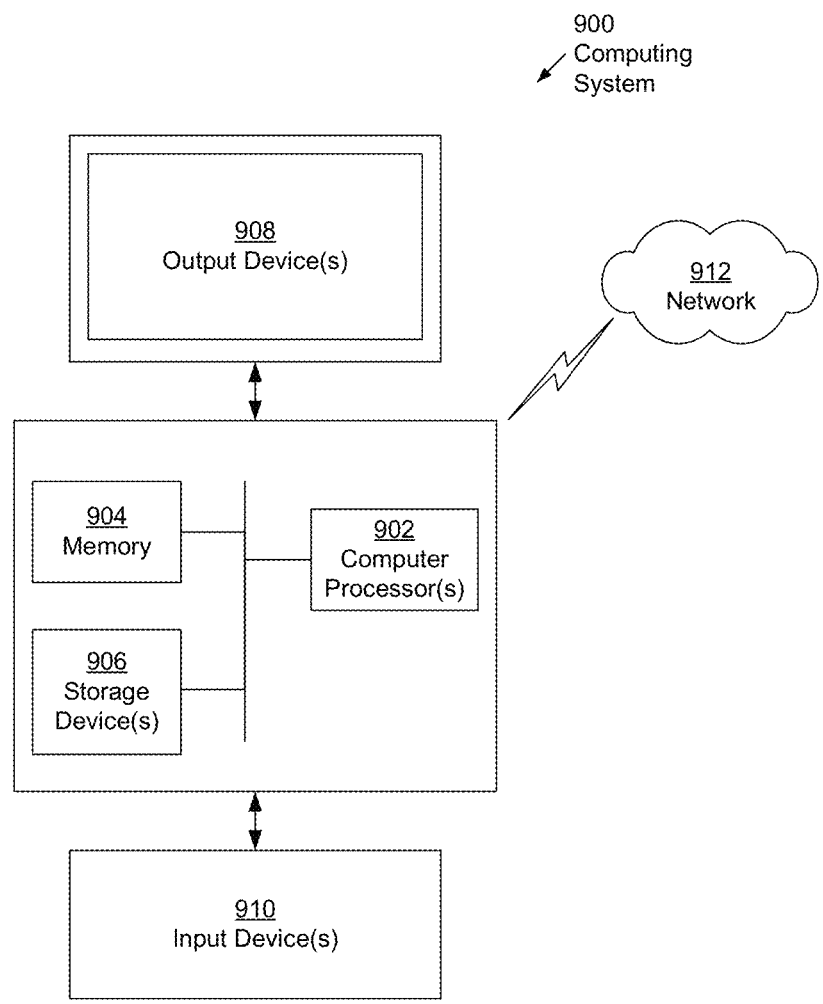
FIG. 9 shows a computing system in accordance with one or more embodiments of the invention.

The cloud 240, in accordance with one or more embodiments of the invention, may be formed by multiple/many networked computing devices. These computing devices may be geographically and organizationally distributed in any way. For example, some of these computing devices may be located in a data center, whereas other such computing devices may be individual physical or virtual servers. An exemplary computing system, as it may be used in the cloud 240, is shown in FIG. 9. One or more of the computing devices may host the processing platform 270, analogous to how the processing platform 270 is hosted on the satellite communication terminal 210. While the components of the processing platform 270 that are executing on the satellite communication terminal 210 and that are executing on a computing device in the cloud 240 may operate separately, they are interconnected via the satellite backhaul link 144, thus enabling synchronization between these components. Accordingly, the same information may be available, regardless of whether the user application 250 connects via the satellite communication terminal 210 or via the cloud 240. Temporary discrepancies may exist though, e.g., during times when the satellite backhaul link 144 is interrupted, and a synchronization is therefore unavailable. Further, because additional data processing may be performed in the cloud 240, additional data, resulting from the additional processing, may be available when connecting to the processing platform 270 via the cloud 240. Such data may, however, also be available via the satellite communication terminal 210, if synchronization via the satellite backhaul link 144 is maintained. The cloud 240 may run multiple instances of the processing platform 270 in order to support the load of many devices and/or many users. Depending on the configuration of the processing platform 270, incoming data (i.e., data received from a particular access point 112, a particular device, a particular site, or a particular customer) may be distributed between multiple instances, or may be consistently assigned to the same instance (e.g., by using a consistent hash ring configuration).

Those skilled in the art will recognize that other configurations that deviate from the configuration introduced in FIG. 2E may exist, without departing from the invention.

In one or more embodiments, a field environment 100 can only intermittently establish the satellite backhaul link 144 to the satellite 145. Therefore, the processing platform 270 may solely execute on the satellite communication terminal 210. In such a scenario, the satellite communication terminal 210 may be configured to temporarily "self-backhaul" (i.e., the satellite communication terminal 210 may collect and consolidate data and may perform some or even all of the processing that would otherwise be performed in the cloud).

In one or more embodiments, the satellite communication terminal 210 may partially or completely share one or more instances of the processing platform 270 with a hub 118, an access point 112, or a device in the field environment (e.g., a laptop 130).

All processing functionality, even functionally that would typically be provided by the satellite communication terminal 210, may be provided in the cloud 240. The configuration of the satellite communication system, with or without a hub 118, with or without access points 112, may be transparent (i.e., devices in the field environment 100 may operate in the same manner, regardless of the presence of a hub 118, access point 112, or reliable satellite backhaul link 114). Similarly, a user may experience the same satellite communication system, whether or not a hub 118, access point 112, or reliable satellite backhaul link 114 is present.

Figure 2F:
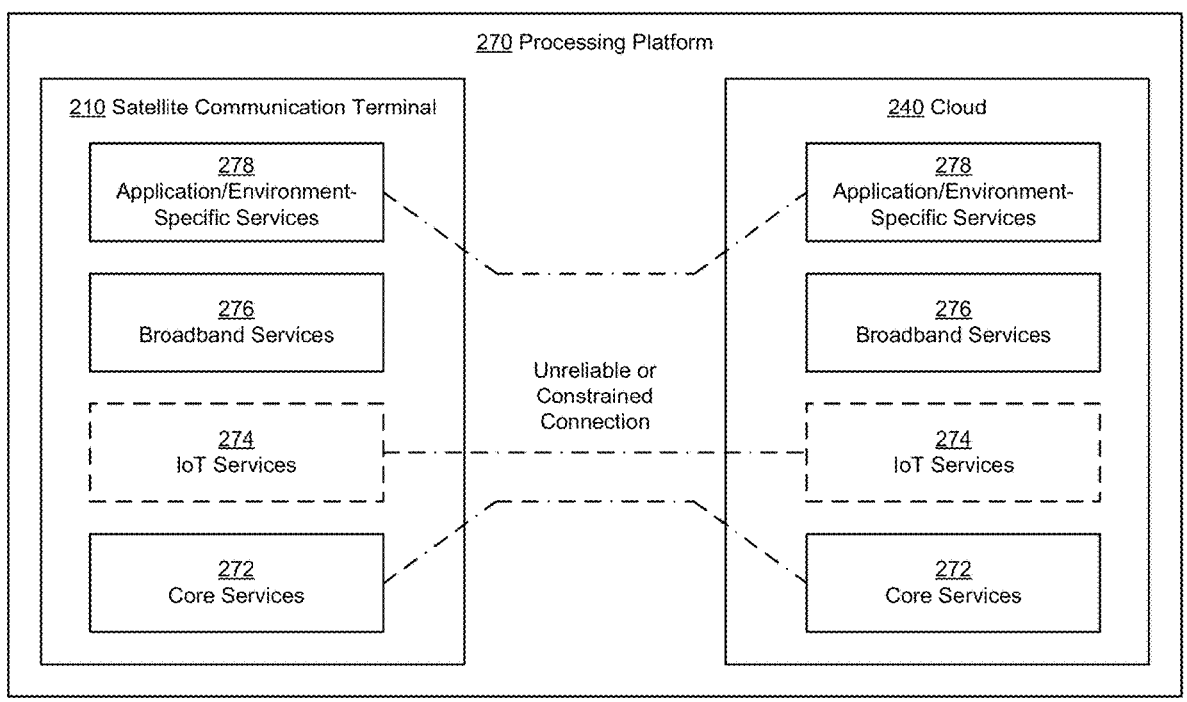

FIG. 2F shows a processing platform, in accordance with one or more embodiments of the invention. In one or more embodiments, the processing platform 270 is organized in layers. Those skilled in the art will appreciate that, any organization of services or operations executed by the processing platform may be used and that the invention is not limited to the following configuration. Further any services described herein may be shared or distributed among one or more layers.

Core services 272 provide basic functionalities such as data storage, networking, and messaging.

Above the core services 272, the optional IoT services 274 provide services specific to IoT networks, but that are not necessarily required in all applications. The IoT services 274 may include location services (e.g., GPS, TDOA or RSSI based), IoT network services, and configurations, etc.

Above the IoT services 274, the broadband services 276 provide services to manage broadband communication between a device in the field environment 100 (e.g., a monitoring device 104, an access point 112, a smartphone 128, or a laptop 130) and the connected network.

In one or more embodiments, broadband services 276 may include routing, switching, or authorizing the exchange of data. For example, broadband services 276 may comprise managing an authorization of the device or a user of the device to communicate within a local network connected to the satellite communication terminal 210 or an external network connected to the satellite 145. Authorization may be based upon credentials of the device or credentials of the user. Furthermore, authorization may control the ability of the device/user to exchange data with other devices/users in the local network or the external network.

In one or more embodiments exemplified in FIG. 1J, a satellite communication terminal 119 may support a local network utilized by multiple customers (e.g., Customers 1-4 in Network Site A 192). The satellite communication terminal 119 may authorize communication (e.g., access to data or exchange of data) between multiple devices owned by a single customer (e.g., Customer 1), but may prevent communication between different customers (e.g., limit or entirely stop communication between Customer 1 and Customers 2-4). Alternatively, authorization to communicate between different customers in Network Site A 192 may be granted if the different customers establish a mutual agreement with an owner/operator of the satellite communication terminal 119.

In one or more embodiments exemplified in FIG. 1J, the satellite communication terminal 119 in Network Site A 192 may be linked with an external network in Network Site B 194 (e.g., a remote site that may be accessed via the satellite 145 and the satellite backhaul link 144). Network Site B 194 may be exclusively utilized by Customer 1 from Network Site A 192. Accordingly, the satellite communication terminal 119 in Network Site A 192 and/or Network Site B 194 may be configured to authorize communication between all devices owned/operated by Customer 1 in both the local network (Network Site A 192) and the external network (Network Site B 194).

In one or more embodiments, the satellite communication terminal 210 may independently authorize the device/user to communicate with the cloud 240 or an external network such as the world wide web.

In one or more embodiments, the authorization may comprise a level of service within the local network connected to the satellite communication terminal or the external network connected to the satellite. For example, the level of service may define one or more formats of data (e.g., text data, voice data, video data) that the device/user is authorized to utilize. Furthermore, the level of service may define one or more bandwidths allocated to the device/user (e.g., bandwidth limits, data caps). An allocated bandwidth may apply to all communication by the device/user; communication by the device/user within a specific network (e.g., the local network, the external network, or some combination of networks); communication within a predetermined time period, or any other appropriate metric to manage broadband communication facilitated by the satellite communication terminal 210. Further still, the level of service may define the type of network connections the device/user is allowed to use for connecting with a network (e.g., wireless link, wired link, broadband link, IoT link, or a combination of links).

In one or more embodiments, the authorization configuration implemented by the broadband services 276 in the satellite communication terminal 210 may be mirrored in the cloud 240, other satellite communication terminals 210, a hub 118, or any other computing device.

Furthermore, broadband services 276 may further include general data services such as aggregating, filtering, fusing, compressing, encrypting data, and the like.

The topmost layer includes application/environment-specific services 272. In one or more embodiments directed to a field environment in healthcare facility, the application/environment-specific services 272 may include analysis of patient vital signs, a patient location tracking interface, etc. In one or more embodiments directed to a field environment in oilfield facility, the application/environment-specific services 272 may include pipeline operation analytics, equipment command/control interfaces, sensor monitoring/analysis, etc. Other application/environment-specific layers may be added, replaced, or removed without departing from the invention.

The processing platform 270 is modular, allowing adaptation to many applications, depending on the services required by the field environment 100.

In one or more embodiments, the services of the processing platform 270 may be available through the satellite communication terminal 210 and/or through the cloud 240. A synchronization may be performed between the services executing in the cloud 240 and the services executing on the satellite communication terminal 210, thus maintaining consistency between the satellite communication terminal 210 and the cloud 240. As long as a satellite backhaul link 144 is available, the data available through the satellite communication terminal 210 and through the cloud 340 may be identical.

However, if the satellite backhaul link 144 becomes temporarily unavailable because of an unreliable or constrained data connection, data that is accumulated (i.e., buffered) on the satellite communication terminal 210 may not be available through the cloud 240, and vice versa. A synchronization may be performed once the satellite backhaul link 144 is restored, to update the cloud 240 and the satellite communication terminal 210. Accordingly, consistent information (e.g., data, network configuration, or authorization information) is available via satellite communication terminal 210 and cloud 240.

The conventional methods for beam arrays rely on a complex gain for each antennal element to steer the antenna beam; a costly solution. In addition to hardware complexity and cost of complex gain components, the mathematics of finding the correct values for the complex gains is too sophisticated. As a result, it is difficult to do real-time computations within the resource limited terminals. In addition, conventional array structures typically rely on a uniform placement of the antenna elements. The resulting symmetry causes unwanted lobes in the antenna patterns. In one or more embodiments, first, complex gain component is replaced with a quantized set of phase values, typically {0', 45', 90', 135' 180', 225', 270', 315'} with a static gain which is used as a tapering function to reduce the levels of grating lobes.

One or more embodiment may includes 3-bits phase shifters for each antenna element. In another embodiment, 3-bits phase shifters for each antenna element, plus the ability to bypass a subset of the antennas is used. Another embodiment partitions the set of antennas into several subsets, apply a discretized phase shifter for each antenna element, combines (RF combining) the signals from antenna elements within each subset, apply a complex gain to the combined RF signal corresponding to each subset, and once again combines the resulting signals (RF combining) prior to down-conversion. Another embodiment partitions the set of antennas into several subsets, use a discretized phase shifter for each antenna element, combines (RF combining) the signals from antenna elements within each subset, uses a separate receive chain (down-conversion, A/D) for each composite signal corresponding to each subset, processes (combines) the different base-band signals to optimize the performance of the equivalent antenna array. Another embodiment partitions the set of antennas into several subsets, apply a discretized phase shifter for each antenna element, combines (RF combining) the signals from antenna elements within each subset, down-coverts the resulting combined signals, apply a complex gain to the resulting down-converted analog signal corresponding to each subset, combines the resulting weighted analog signals, e.g., using an operational amplifier, and then passes the result through Analog-to-Digital Conversion for digital base-band processing.

Circular polarization for satellite connections is formed by adding the vertical and horizontal polarizations with 90' relative phase shift. In prior art, this 90' phase shift is applied at the RF, creating an antenna with a single terminal. The shortcomings of the prior art, which this invention tackles, are as follows: (1) It is not possible to dynamically change between RHC and LHC, (2) The coupling between RHC and LHC will be low because, in general, a RHC signal will be orthogonal to a LHC only if the incident wave propagates orthogonal to the antenna surface, and its vertical and horizontal signals have the same magnitude. For example, consider a RHC array which is placed on the XY plane and its main beam is focused along the Z-axis. Then, if an incident LHC wave propagates along the Z axis, the RHC antenna array will not receive any signal from the incident LHC wave. In practice, antenna arrays are built to enable steering their beams, which means in vast majority of scenarios encountered in practice, the conditions for perfect isolation between RHC and LHC, as explained in the earlier example, will not be valid. For receiving arrays, this potentially results in a large amount of interference from a nearby LHC satellite to leak into a RHC receiver array. Similarly, for a transmitting RHC array with a beam steered sideway, the array can radiate a significant LHC wave, causing unwanted interference, and potentially violating the underlying regulatory requirements. (3) Traditional circularly polarized antennas are designed (and set on the factory floor) to operate either as RHC, or LHC. It is desirable that the selection between RHC and LHC may be still performed after the antenna has left the factory. One or more embodiments disclosed herein solve these shortcomings; provide the means to support multiple beams; provide the means to improve cross coupling (leakage between RHC and LHC polarizations), and provide the means to create the effect of virtual tilting of the antenna element.

Methods of one or more embodiments disclosed herein result in the following benefits with respect to the prior art. (1) LHC vs. RHC selection is done at base-band, and the antenna can indeed listen simultaneously to one LHC and one RHC satellites. LHC vs. RHC selection may be also through combining two RF signals; first, an RF signal V is obtained by combining vertical polarizations from different antenna elements (upon adjusting their relative phase values), and an RF signal H is obtained by combining horizontal polarizations from different antenna elements (upon adjusting their relative phase values). Then, signals V and H are each multiplied (in the RF domain, for example using a vector modulator) by a complex gain to adjust their relative magnitude and phase, the two resulting signals are combined, and the outcome is processed by a single baseband chain. (2) By measuring angles of incident, separately over the horizontal and vertical polarizations and their variations over time, we can estimate the speed of satellite in two directions (spanning the X-Y plane of earth surface), and thereby measure the direction and speed of satellite with respect to the ground terminal. This helps in tracking the satellite.

In summary, using methods disclosed herein in conjunction with: (1) antenna elements with 2 or 4 terminals improves the RHC/LHC isolation, (2) antenna elements with 4 terminals creates the effect of virtual tilting, (3) antenna elements with 2 or 4 terminals improves signal-to-noise ratio using maximum ratio combining, as well as cancels the effect of undesirable incoming signals (nulling interference).

One or more embodiments of the invention also discloses an alternative structure wherein only a subset of antenna elements (auxiliary sub-array) are equipped with at least one additional terminal, and the additional terminal in the antenna elements forming the auxiliary array are used to track the next satellite while listening to the current one using the entire array. In some embodiments, all antennas have at least 2 terminals, a subset of antennas used for tracking the next satellite have 3 or 4 terminals. In this configuration, all antennas elements contributed to the formation of the primary beam, while the additional terminal(s) in the subset of antenna elements forming the auxiliary sub-array are used for tracking the next satellite.

It is desirable to detect the next satellite to connect to, while having an ongoing connection with a first satellite. Prior art is based on using two arrays, one for serving the main satellite connection, and one working independently searching for the next satellite to connect to. One or more embodiments of the invention relies on an auxiliary array composed of a small number of antenna elements, placed within the main array, to find the next satellite. These auxiliary antenna would listen to a sync signal, or some other form of pilot, sent as part of the satellite signaling, and use it to find the next satellite. Antennas forming the auxiliary array are placed in a manner that would improve the search accuracy with a small complexity. In particular, geometrical symmetries result in mistaking the correct direction with some of its symmetrical images, same phenomenon that causes side-lobes (for example, an elevation angle may be mistaken for the same angle plus 90 degrees).

To handle this problem, one or more embodiments distribute the antennas forming the auxiliary array in a non-uniform manner throughout the antenna surface, which in a sense enables non-uniform spatial sampling of the antenna aperture. The signals from antenna elements in the auxiliary array, forming a vector V, are used as the argument of a function $f(V)$ that maps the vector to the satellite direction for example, use a lookup table for $f(.)$ and quantize the vector to point to entries within the table (each specifying a satellite direction). Note that $f(.)$ indeed specifies what the beam for the main array should be to switch to the second satellite. On the other hand, it is expensive to read the signal received by each element in the auxiliary array, as it would normally require a receive chain composed of down-conversion & A/D. One possible solution would be to share a single receive chain among all antenna elements and use a switch to select/record the antenna elements one-by-one. This naïve solution has two problems: (2) Different antennas see different parts of the incoming pilot signal (as mentioned earlier, this would be a sync signal, or some other pilot sent as part of the satellite signaling). (2) Use of a switch to select a single antenna would be complex in terms of hardware.

One or more embodiments disclose the following techniques to handle these issues. (1) A selectable 0°/180° phase shifter is deployed for each antenna element within the auxiliary array (use a switch for each antenna to select the phase to be either 0, or 180's for each of the antennas)—this selection of phase should not be confused with beam-steering, although in essence it does steer the beam of the auxiliary array. (2) Combine the phase-shifted signals from different antennas at the RF. (2) A single receive chain is deployed to read the combined signal, while the control circuitry adjust the 0°/180° selection switches in order to span through different combinations corresponding to different coordinates of a Hadamard matrix for the 0'/180' phase shifts. Note that 0°/180° phase shifts result in multiplying the signal from a given antenna element by +1/−1. The motivation behind using the Hadamard matrix is that: (1) Effect of multiplication by the Hadamard matrix may be realized in the RF domain using a simple circuitry. (2) Any orthogonal basis provides a complete statistical description of any vector signal contaminated in additive Gaussian noise. This means reading the result of the expansion on the Hadamard basis is as effective as sampling/reading all the relevant components, but, as mentioned earlier, sampling/reading using Hadamard matrix is easy to implement. It follows that, reading the Hadamard basis provides all the information one could gather by reading all the antenna elements. However, this alternative approach is much more complex as it requires either using a separate receive chain for each antenna element, or using a complex 8×1 RF switch in conjunction with a single receive chain.

One or more embodiments include measuring angle of incident and its variations over time, in addition to measuring the Doppler frequency shift, and using the measure the direction and speed of satellite with respect to the ground terminal. This helps in tracking the satellite. To provide a higher degree of selectivity in measuring angle of incident and its variations over time, methods of one or more embodiments change the alignment of the antenna element by applying a different rotation angle to each element within the auxiliary array. In another embodiment, all the antenna elements are placed out of alignment (each antenna element has its own rotation angle when placed on the array surface). This configuration results in randomizing the behaviors of different antenna elements in their treatment of an incident circularly polarized wave. Then, due to the fact that the signals from different antenna elements will be added (combined in the RF) to form the combined received signal, an averaging effect occurs which reduces the variance of variations for different directions of the incident wave. Note that in any communication system, the worst case occurrence of any undesirable phenomenon acts as the system bottleneck. For example, incident waves can experience very poor isolation between RHC and LHC if arriving from certain directions. Averaging helps to balance the good and the bad and thereby avoid bottlenecks. Position and orientation of the antenna elements may be optimized using known optimization techniques to improve the averaging effect, which in essence creates an Ergodicity effect.

Figure 3A:
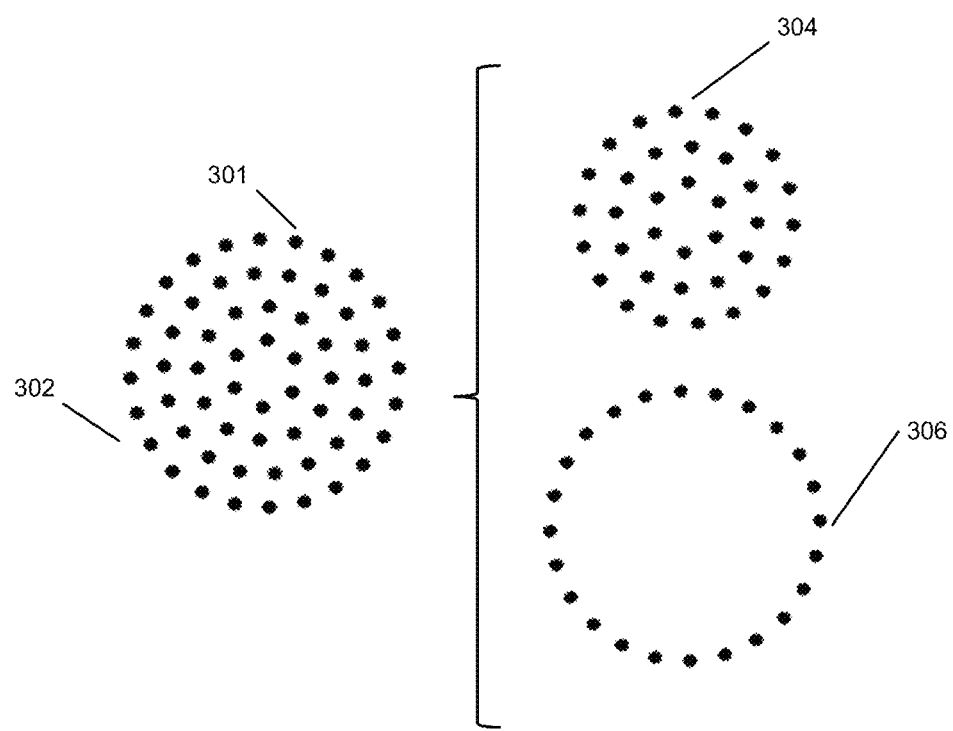
FIGS. 3A-3C illustrate an antenna array divided into two sub-arrays in accordance with one or more embodiments of the invention.

FIG. 3A shows an antenna array 302 with a plurality of antenna elements 301 in a circular form, in accordance with one or more embodiments of the invention. In particular, FIG. 3A shows one example of an arrangement of satellite antenna elements for the satellite shown and described above in FIG. 2C. The antenna array 302 is divided into a first sub-array 304 and a second sub-array 306. The first sub-array 304 and the second sub-array 306 are used to achieve different objectives in one or more embodiments of the invention, as explained with respect to FIGS. 4-7. As shown in FIG. 3A, the antenna arrays 302, 304, 306 are arranged in a circular geometrical shape. Those skilled in the art will appreciate that the antenna arrays may be arranged in any suitable geometric shape and are not limited to circular patterns. For example, the antenna arrays may be arranged in any polygonal shape (square, rectangle, triangle, rhombus, etc.) or any other suitable shape without departing from embodiments disclosed herein.

FIG. 3A shows an antenna array 302 with a plurality of antenna elements 301 in a circular form, in accordance with one or more embodiments of the invention. In particular, FIG. 3A shows one example of an arrangement of satellite antenna elements for the satellite shown and described above in FIG. 2C. The antenna array 302 is divided into a first sub-array 304 and a second sub-array 306. The first sub-array 304 and the second sub-array 306 are used to achieve different objectives in one or more embodiments of the invention, as explained with respect to FIGS. 4-7. As shown in FIG. 3A, the antenna arrays 302, 304, 306 are arranged in a circular geometrical shape. Those skilled in the art will appreciate that the antenna arrays may be arranged in any suitable geometric shape and are not limited to circular patterns. For example, the antenna arrays may be arranged in any polygonal shape (square, rectangle, triangle, rhombus, etc.) or any other suitable shape without departing from embodiments disclosed herein.

Further, as shown in FIG. 3A, the second subarray 306 is a subset of the first subarray 304. However, in one or more embodiments, the second sub-array may be larger than the first subarray, and any suitable number of antenna elements may be included in both the first and second subarray without departing from embodiments disclosed herein. Further, while two antenna subarrays are shown in FIG. 3A, those skilled in the art will appreciate that the antenna array may be subdivided into any number of suitable subarrays of antenna elements, each of identical or different geometrical shape.

Figure 3B:
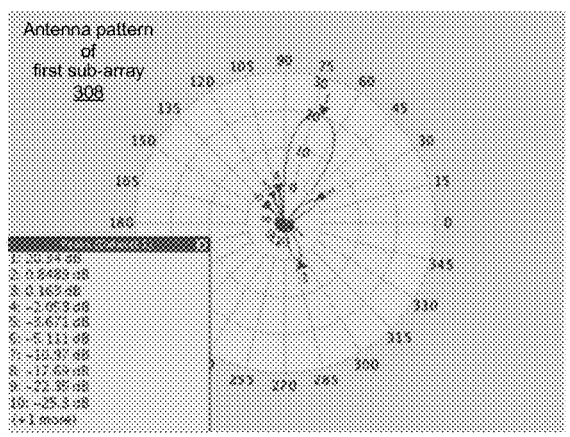
Figure 3C:
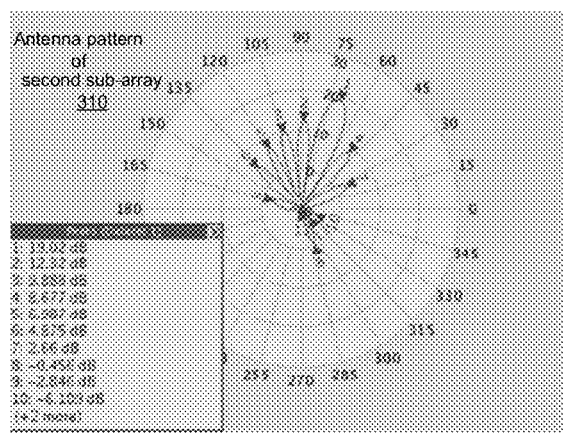

FIG. 3B shows an antenna pattern 308 corresponding to the first sub-array 304, and FIG. 3C shows an antenna pattern 310 corresponding to the second sub-array 306, in accordance with one or more embodiments of the invention. The radiation patterns or antenna patterns 308 and 310 are the graphical representation of the radiation properties of the antenna as a function of space in terms of "azimuth" and "elevation". In other words, the antenna's pattern describes how the antenna radiates energy out into space or how it receives energy. An azimuth plane pattern is measured when the measurement is made traversing the entire x-y plane around the antenna under test. An elevation plane is then a plane orthogonal to the x-y plane, (e.g. φ=90 deg). The elevation plane pattern is made traversing the entire y-z plane around the antenna under test.

Figure 3D:
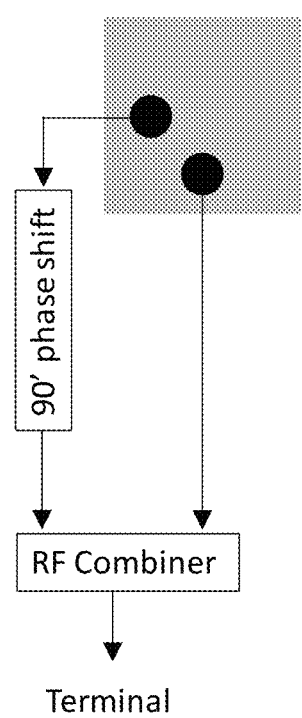
FIGS. 3D-3H illustrate using a hierarchical structure to reduce complexity in the formation of the weighted sum required for beamforming in different methods in accordance with one or more embodiments of the invention.
Figure 3E:
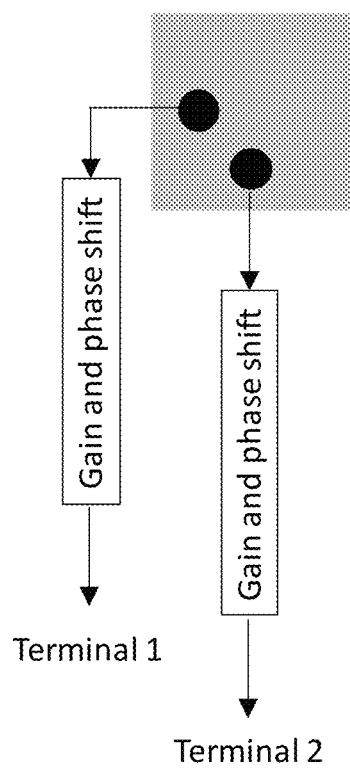
Figure 3F:
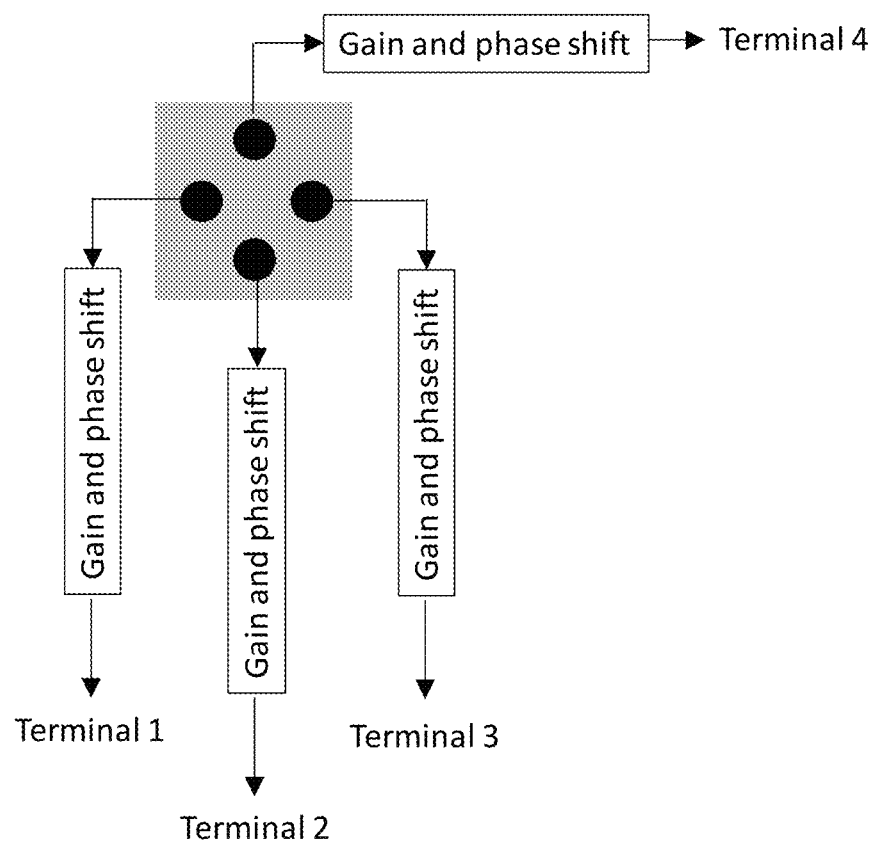

More generally, in methods disclosed herein, antenna elements include a physical body, and each physical body may be equipped with multiple terminals. As such antenna terminals may be separately excited, then a physical antenna can result in multiple "effective antenna" elements that share the same physical antenna structure. FIG. 3D depicts a patch antenna constructing a circular polarized antenna. In this case, a single physical antenna has created a single effective antenna. FIG. 3E depicts a patch antenna, wherein a single physical antenna has created two effective antenna. FIG. 3F depicts a patch antenna, wherein a single physical antenna has created four effective antenna. In explaining the methods of one or more embodiments, the word "effective antenna element" and "antenna element" are interchangeably used, where there are no chances of confusion. Note that FIGS. 3D, 3E, and 3F are depicted to represent receive mode, but it would be clear to those skilled in the art that a similar structure would be applicable for transmit mode.

In methods disclosed herein, the operation of antenna beamforming is realized by using a hierarchy to gradually form a weighted sum of signals corresponding to the available effective antenna elements. To explain the concept, an example, in which the hierarchy is composed of two stages, will be provided next. In a first stage of the weighting hierarchy, antenna beamforming is performed by applying an adjustable phase shift, possibly plus a constant gain factor, to the signal from each effective antenna element. Then, the set of effective antenna elements are partitioned into some subsets, and the RF signals from the effective antenna elements within each subset are combined to obtain a set of combined RF signals. Then, in the second stage of the weighting hierarchy, a complex gain is applied to each such combined RF signal, and finally the results are combined once again.

Figure 3G:
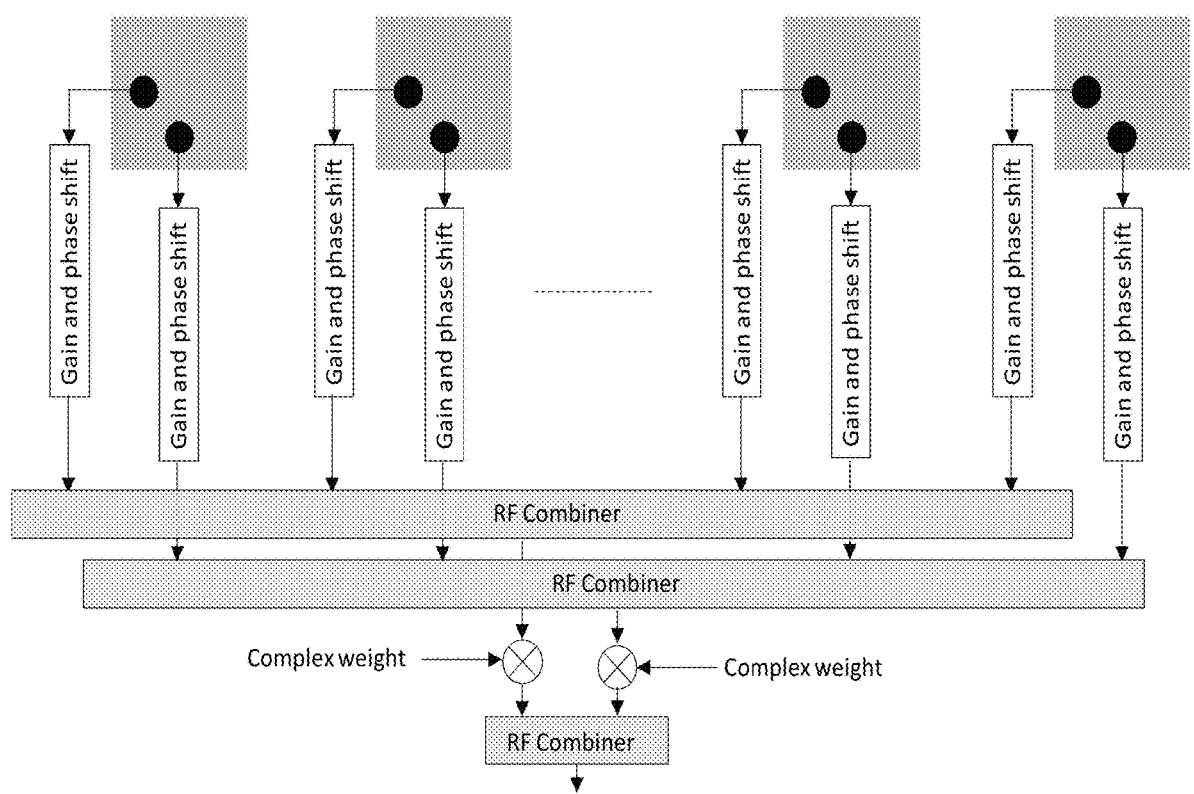
Figure 3H:
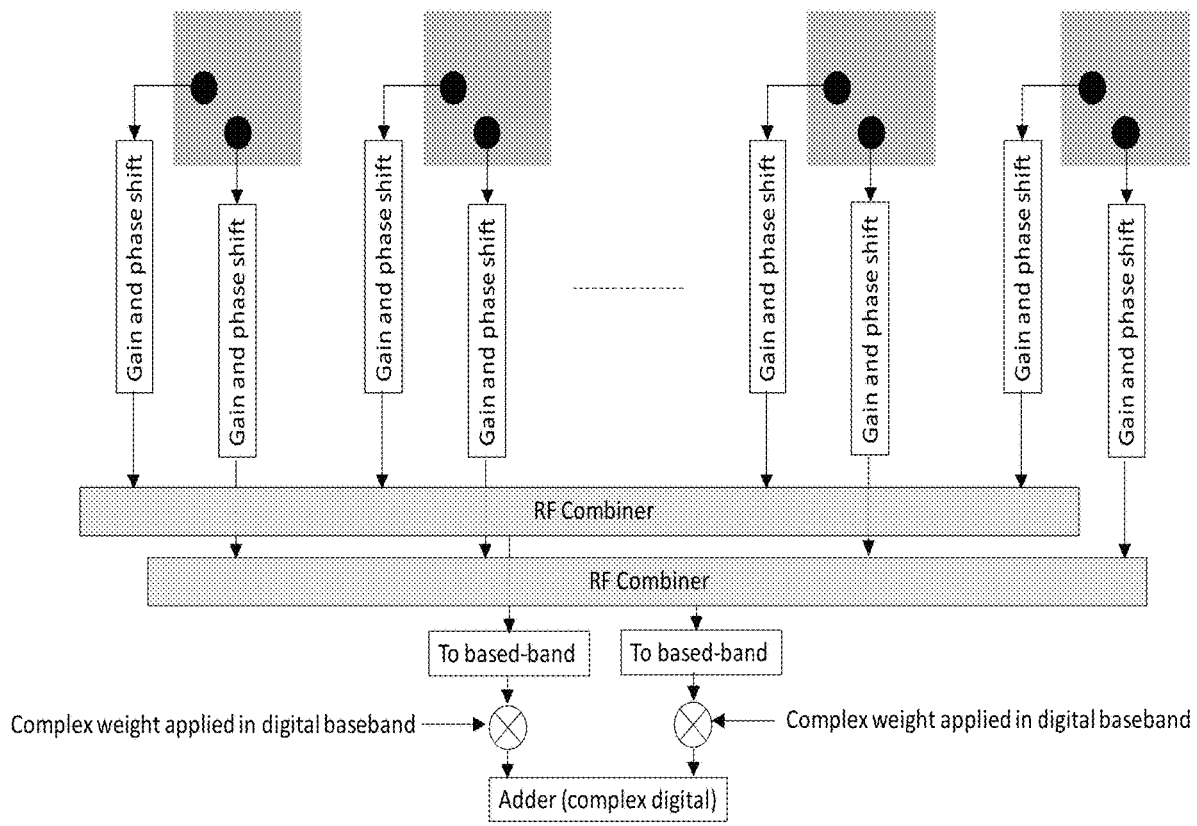

To reduce the complexity, in the methods disclosed herein, some of the weight factors are realized in the form of a change in the phase, and some are realized in the form of changing both phase and magnitude (complex multiplication). To further reduce the complexity, the method used for weighting differs in different stages of the weighting hierarchy. FIG. 3G and FIG. 3H show two examples. In FIG. 3G, each physical antenna forms two effective antenna corresponding to its vertical polarization and its horizontal polarization. This divides the set of effective antenna into two subsets, one corresponding to all vertical polarizations and the other one corresponding to all horizontal polarizations. The signals from antenna terminals in the first subset, which includes all vertical polarizations, are combined in the RF domain, and likewise, signals from antenna terminals in the second subset, which includes all horizontal polarizations, are combined in the RF domain. In the next stage of the hierarchy, these two signals should be weighted and combined once again, in order to complete the weighted sum. In methods of one or more embodiments, this operation is performed in at least two different manners, shown in FIG. 3G and FIG. 3H, respectively.

In FIG. 3G, the RF signal obtained by combining vertical polarizations is passed through a complex multiplication in the RF domain, and likewise, the RF signal obtained by combining horizontal polarizations is passed through a complex multiplication in the RF domain, and then the results are combined in the RF and the final outcome is brought to base-band. Complex multiplication in the RF domain may be implemented, for example, using an RF vector modulator. On the other hand, in FIG. 3H, the RF signal obtained by combining vertical polarizations and the RF signal obtained by combining horizontal polarizations are separately brought to base-band and the final stage of the hierarchy in forming the weighted sum is performed in the base-band using digital numbers.

In some other embodiments, including the embodiments described here for the purpose of finding the direction of the satellite movement, the grouping of the antenna elements is more sophisticated, wherein, grouping of the antenna elements into subsets is performed by dividing the array into a number of sub-arrays, and dividing the antenna elements accordingly. It will be clear to individuals skilled in the art that the aforementioned grouping mechanisms, one based on the polarizations and the other one based on dividing the array into subarrays, may be combined, and accordingly the number of stages in the weighting hierarchy increases.

In some embodiments, the effective antenna corresponding to vertical polarization and the effective antenna corresponding to horizontal polarization, are each equipped with their own phase shifter, but to reduce the complexity, the two phase shifters are controlled with a shared set of control lines. This means, the phase selected for the effective antenna corresponding to vertical polarization in a physical antenna and the phase selected for the effective antenna corresponding to horizontal polarization in the same physical antenna will be the same.

One or more embodiments are based on realizing, and benefiting from, the following features and abilities:

First Feature: The ability to separately observe the combined signal corresponding to different "subsets of effective antenna" prior to combining these signal in the next stage of the weighted sum hierarchy, wherein, to observe the combined signal corresponding to each "subsets of effective antenna", typically, the corresponding combined signal is brought to base-band and measurements are performed in the base-band.

Second Feature: The ability to separately select the weights corresponding to different "subsets of effective antenna" prior to combining them, wherein, separate selection of the weight corresponding to each "subsets of effective antenna" may be performed: (1) in the RF domain using complex multiplication, for example using a vector modulator for each multiplication operation, or (2) in base-band by separately bringing each combined signal, corresponding to each of the "subsets of effective antenna," to base-band.

In one or more embodiments, the first feature is deployed to: (1) Detect the direction of the movement of the satellite with respect to the terminal. (2) Detect the direction from the terminal to a second satellite, while maintaining the connection to a first satellite, for the purpose of conducting soft or hard hand-off (make before break). (3) Detect direction to an interfering satellite, while maintaining the connection to a desired satellite.

In one or more embodiments, the second feature is deployed to: (1) Decide to support a RHC polarization vs. a LHC polarization after leaving the factory floor. (2) Simultaneously listen to a RHC polarization signal and to a separate LHC polarization signal. (3) Perform Maximum Ratio Combining (MRC) by adjusting the weights corresponding to different combined signals from different subsets of effective antenna in order to improve the signal to noise ratio. (4) Perform nulling an interfering satellite by adjusting the weights corresponding to different combined signals from different subsets of effective antenna, while at the same time improving the signal to noise ratio to a desired satellite. (5) Improving isolation between LHC and RHC polarizations. (6) Perform Maximum Ratio Combining (MRC), instead of equal gain combining used in prior art in dealing with circular polarizations, by adjusting the weight corresponding to the subset formed from vertical polarizations vs. the weight corresponding to the subset formed from horizontal polarizations.

Figure 4:
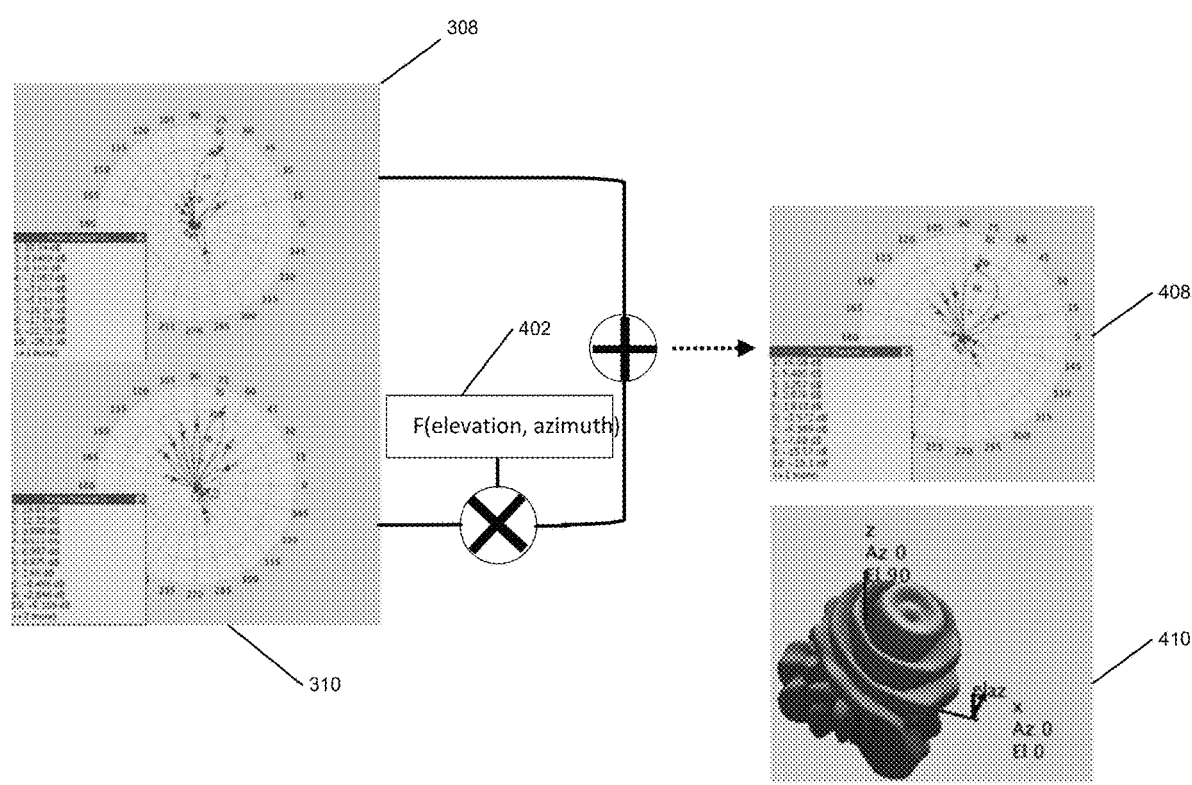
FIG. 4 illustrates determination of a first virtual pattern in accordance with one or more embodiments of the invention.
Figure 5:
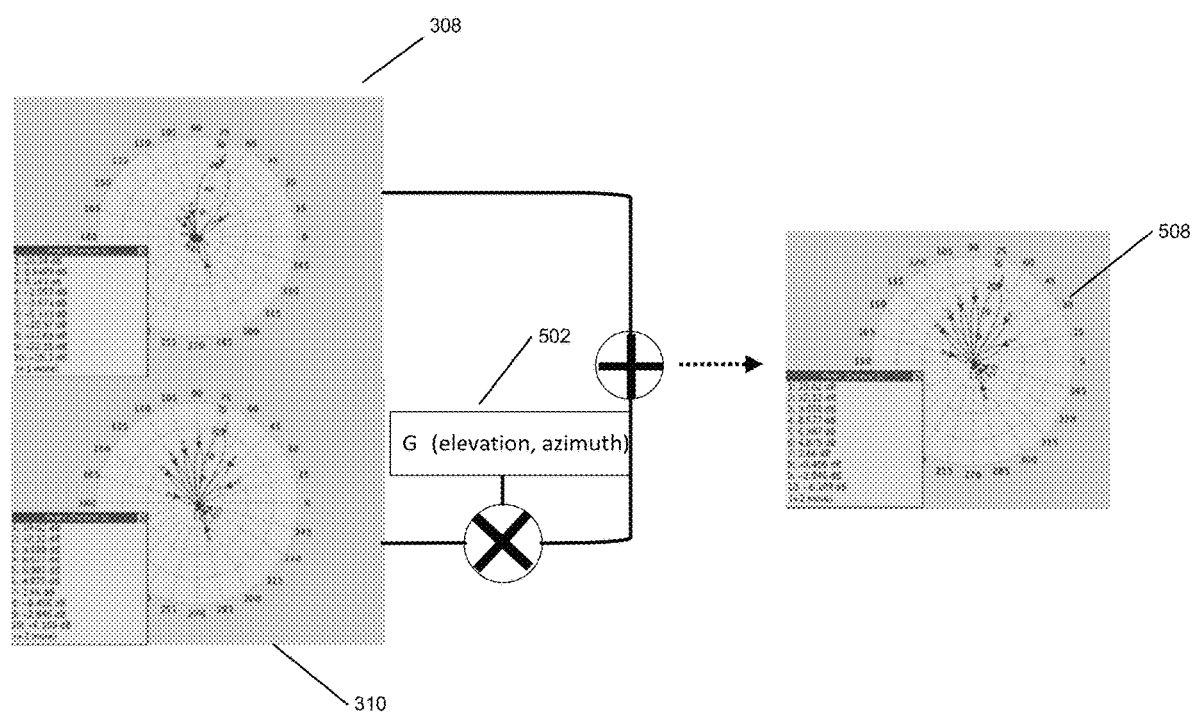
FIG. 5 illustrates determination of a second virtual pattern in accordance with one or more embodiments of the invention.
Figure 6A:
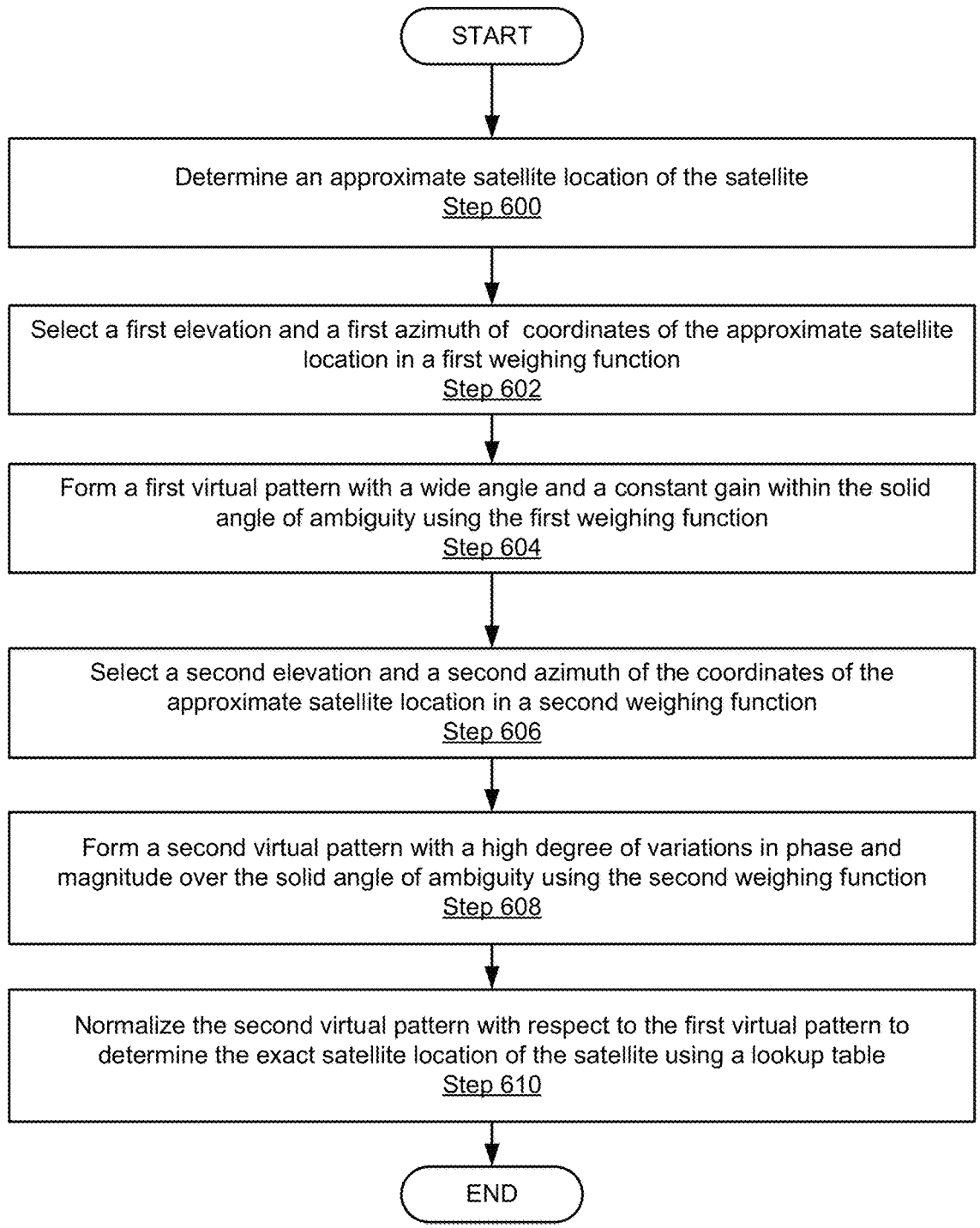
FIG. 6A is a flowchart that describes the steps for determining the exact location of a satellite within a solid angle of ambiguity in accordance with one or more embodiments of the invention.
Figure 6B:
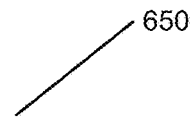
FIG. 6B is an example of a lookup table used for detecting the angle of incident signals in accordance with one or more embodiments of the invention.

In one or more embodiments, the sub-arrays 304 and 306 are used to determine the exact location of a satellite within a solid angle of ambiguity 410, as illustrated in FIGS. 4-6B, where FIGS. 4 and 5 are described within the context of the flow chart shown in FIG. 6A and the illustration of FIG. 6B below.

FIG. 6A is a flowchart that describes the steps for determining the exact location of a satellite within a solid angle of ambiguity in accordance with one or more embodiments of the invention. In step 600, an approximate location of the satellite is determined, for example using GPS-assisted location finding, and then the exact satellite location is determined by forming two virtual patterns at a receive base-band as described in next steps. FIG. 4 illustrates determination of a first virtual pattern 408 in accordance with one or more embodiments of the invention. In step 602, a first elevation and a first azimuth of coordinates of the approximate satellite location are selected in a first weighing function 402 F(elevation, azimuth), as shown in FIG. 4. In step 604, the first virtual pattern 408 is formed with a wide angle and a constant gain within the solid angle of ambiguity 410 using the first weighing function 402. In other words, the first virtual pattern 408 is a function of the antenna pattern 308 corresponding to the first sub-array 304, the antenna pattern 310 corresponding to the second sub-array 306, and the first weighing function 402.

FIG. 5 illustrates determination of a second virtual pattern 508 in accordance with one or more embodiments of the invention. Continuing with the flow chart, in step 606, a second elevation and a second azimuth of coordinates of the approximate satellite location are selected in a second weighing function 502 G(elevation, azimuth), as shown in FIG. 5. In step 608, the second virtual pattern 508 is formed with a high degree of variations in phase and magnitude over the solid angle of ambiguity 410 using the second weighing function 502. In other words, the second virtual pattern 508 is a function of the antenna pattern 308 corresponding to the first sub-array 304, the antenna pattern 310 corresponding to the second sub-array 306, and the second weighing function 502. In step 610, the second virtual pattern 508 is normalized with respect to the first virtual pattern 408 to determine the exact satellite location within the solid angle of ambiguity 410 using a lookup table.

FIG. 6B shows an example of a lookup table 650 used for detecting the angle of incident signals in accordance with one or more embodiments of the invention. In one or more embodiments, a grid is formed over the solid angle of ambiguity 410 and for each point of the grid, the complex gain of the second virtual pattern 508 (after being normalized with respect to the corresponding point of the first virtual pattern 408) is pre-computed and stored as an indicator specifying the particular point in the grid. In resolving the ambiguity in the satellite location, the two virtual patterns 408 and 508 are formed, the second virtual pattern 508 is normalized with respect to the first virtual pattern 408, and then the result is used to identify the relevant entry in the pre-stored table. Each entry in the lookup table 650 corresponds to a point in the grid covering the solid angle of ambiguity 410, and accordingly provides a more accurate estimate of the satellite actual location within the original solid angle of ambiguity 410.

Figure 6C:
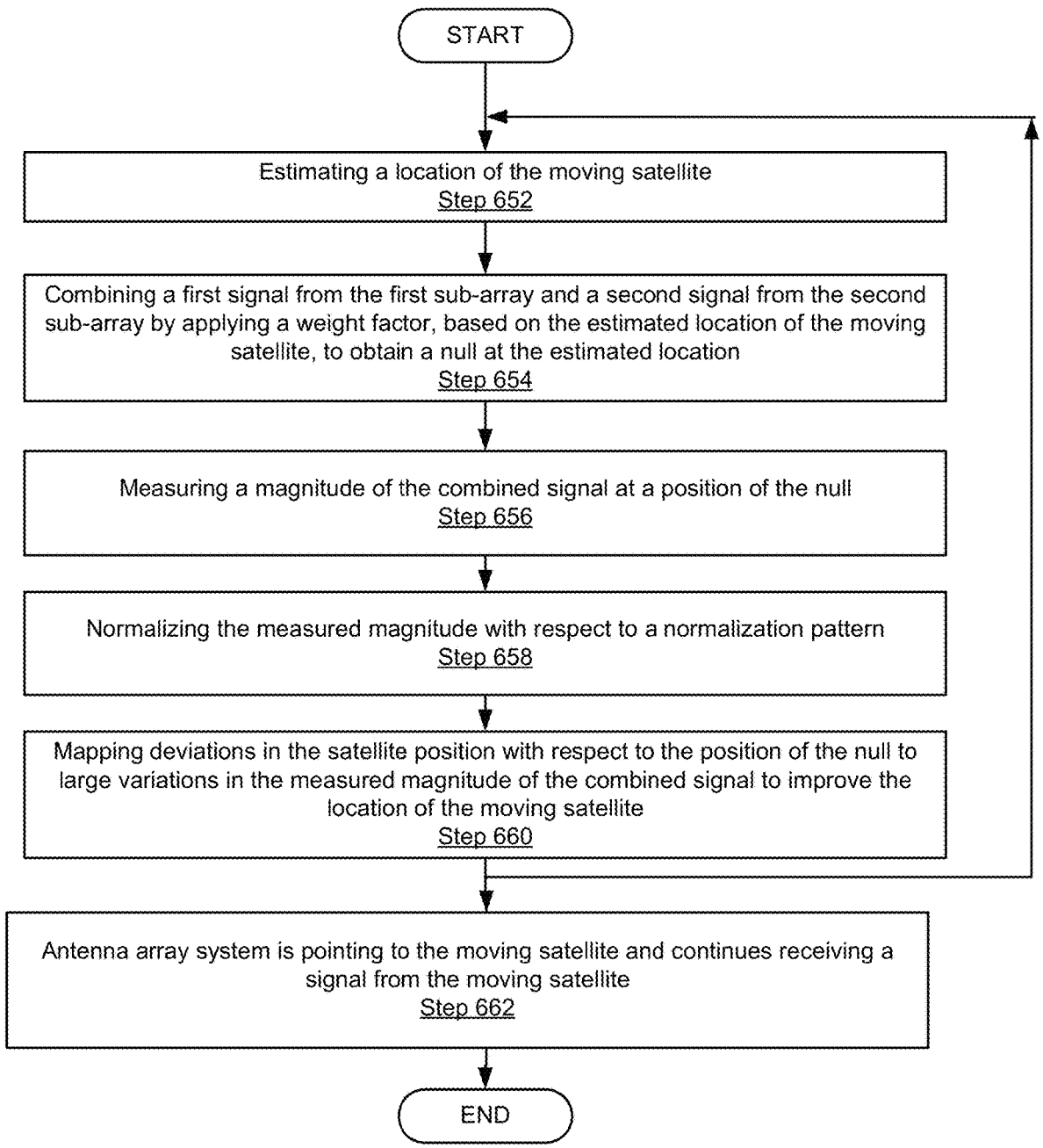
FIG. 6C is a flowchart that describes the steps for tracking a moving satellite in accordance with one or more embodiments of the invention.

In one or more embodiments, the sub-arrays 304 and 306 are used to track a moving satellite. FIG. 6C is a flowchart that describes the steps for tracking a moving satellite in accordance with one or more embodiments of the invention. In step 652, a location of the moving satellite is estimated. In some embodiment, first an approximate location for the satellite is computed using GPS-assisted measurements. Then, the estimate for the location of the satellite is improved using the method explained in steps 600-610 in FIG. 6A above. In step 654, the estimation of the location is further improved by combining a first signal from the first sub-array and a second signal from the second sub-array and applying a weight factor, based on the estimated location of the moving satellite, to obtain a null at the estimated location. In step 656, a magnitude of the combined signal at a position of the null is measured. In step 658, the measured magnitude is normalized with respect to a normalization pattern using the method explained in steps 600-610 in FIG. 6A above. In step 660, small deviations in the satellite position are mapped with respect to the position of the null to large variations in the measured magnitude of the combined signal to improve the location of the moving satellite. This is due to the fact that the signal magnitude will have a large gradient around the null and moving away from the center of the null. This measurement enables the tracker to fine tune the finding of the satellite position. In step 662, steps 652-660 continue in a recursive/iterative manner, each time continuing from the point found in the earlier round and generating a null at its location. It should be noted that all these computations and creation of nulls and following their positions are performed while the antenna beam is pointing to the satellite and continues receiving signal. All other operations are conducted in parallel using readings from the two sub-arrays and performing mathematical operations over the same numbers over and over (as one iteratively fine-tunes the estimate of the satellite location).

It is to be understood that, one or more of the steps shown in the flowcharts of FIG. 6A, 6C, etc., may be omitted, repeated, and/or performed in a different order than the order shown. Accordingly, the scope of the invention should not be considered limited to the specific arrangement of steps shown in the flowchart.

The following use case scenarios are intended to provide examples of possible applications of the antenna with two or more sub-arrays in the satellite communication system, in accordance with one or more embodiments of the invention. The use case scenarios are for illustrative purposes only, and the satellite communication terminal and satellite communication system is not limited to the applications discussed below.

Figure 7A:
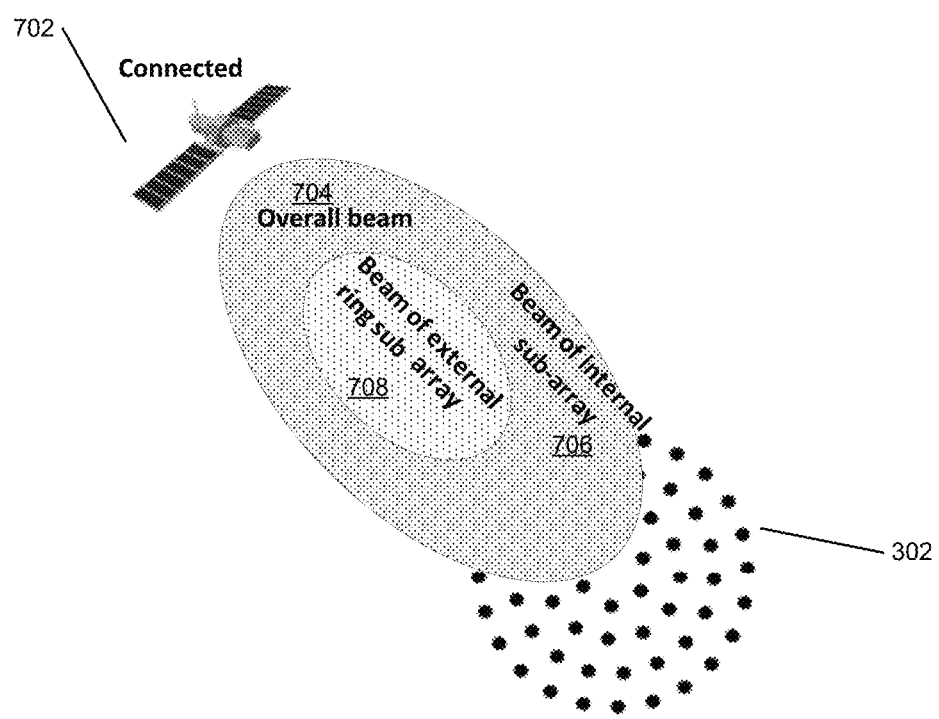
FIGS. 7A-7B illustrate soft hand-off in the antenna with two or more sub-arrays involving an outgoing satellite and an incoming satellite in accordance with one or more embodiments of the invention.
Figure 7B:
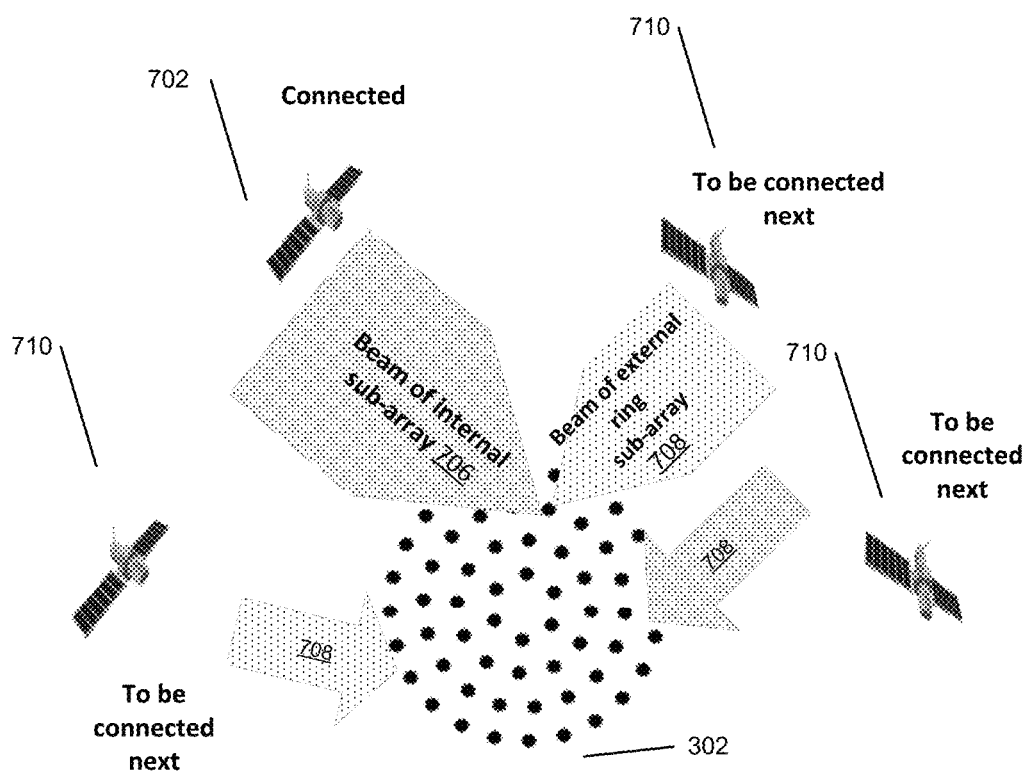

In one or more embodiments, the antenna with two or more sub-arrays is soft hand-off involving an outgoing satellite and an incoming satellite, as illustrated in FIGS. 7A-7B. FIGS. 7A-7B further show examples in which a satellite 702 is connected using both beams 706 and 708 pointing to the direction of the satellite 702. At this point in time, the satellite 702 is connected to the terminal using an entire antenna array 302. Gradually, the satellite 702 reaches a point where it will soon leave the area with line-of-sight connection to a terminal. At this point, the terminal divides its two beams 706 and 708 between the outgoing satellite 702 and the incoming satellites 710 wherein the signals received from the two satellites will be combined in baseband. This is analogous to soft hand-off used in cellular networks. The intention is to provide a smooth transition (without interruption in service) when disconnecting from one satellite and connecting to another one.

In one or more embodiments, the beam 708 is an auxiliary sub-array composed of a very small number of antenna elements 301, placed within the main antenna array 302, to find the next satellite 710. These auxiliary antenna 708 would listen to a sync signal, or some other form of pilot, sent as part of the satellite signaling, and use it to find the next satellite 710.

Figure 7C:
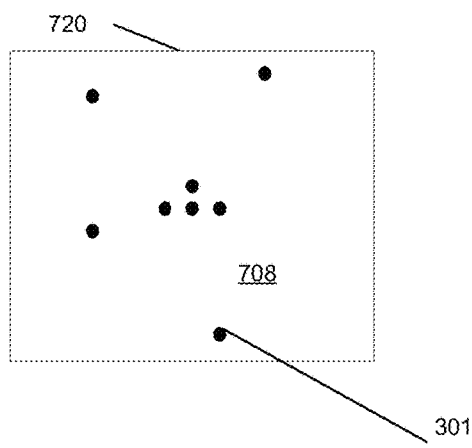
FIGS. 7C-7D illustrate non-uniform and clustered structure for an auxiliary sub-array in accordance with one or more embodiments of the invention.
Figure 7D:
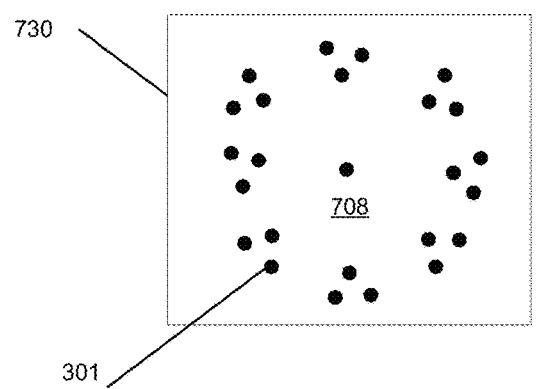

In one or more embodiments, the auxiliary antennas 708 are placed in a manner that would improve the search accuracy with a small complexity. Geometrical symmetries result in making the correct direction with some of its symmetrical images, same phenomenon that causes sidelobes (for example, an elevation angle may be mistaken for same angle plus 90 degrees). FIGS. 7C-7D further show non-uniform and clustered structure for an auxiliary sub-array in accordance with one or more embodiments of the invention. In some embodiments, the small number of antennas 301 are distributed in a non-uniform manner 720 throughout the antenna surface of the auxiliary sub-array 708, which in a sense enables non-uniform spatial sampling of the antenna aperture, as illustrated in FIG. 7C.

In some other embodiments, the small number of antennas 301 are distributed in a clustered structure 730 for the auxiliary sub-array 708, as illustrated in FIG. 7D. In one or more embodiments, a complex signal received by each antenna is read and the combination of such signals are used as a vector V. The resulting vector V is then used as an argument of a function $f(V)$ that maps the vector to the satellite direction, for example, use the lookup table 650 for the function $f(.)$ and quantize the vector to point to entries within the table. The function $f(.)$ indeed specifies what the beam for the main array 302 should be to switch to the second satellite 710.

In one or more embodiments, the antenna with two or more sub-arrays is used for an interference reduction. In this configuration, the two sub-arrays receive a desired signal from a satellite and an interference signal from another satellite. The two sub-arrays may be designed in a manner that the channel matrix for two transmitting satellites and two receiving sub-arrays are, with a high probability, non-singular (is as far as possible from being singular). This property allows to combine the two base-band signals at the receiving end (to subtract the interference terms measured by the two sub-arrays) such that the resulting signal-to-interference plus noise ratio (SINR) is maximized. Those skilled in the art will appreciate that the maximization of SINR includes provision for Maximum Ratio Combining (MRC), wherein the signals from the sub-arrays are combined with relative gain and phase shift in order to maximize the Signal-to-Noise Ratio (SNR) in cases that there are no interfering satellite. In general, the relative weighting used in SINR maximization provides the optimum tradeoff between maximizing the desired signal, and minimizing the noise plus interference such that the ratio of the power of the received signal to the power of the overall noise, including thermal noise and interference, is maximized.

Figure 8:
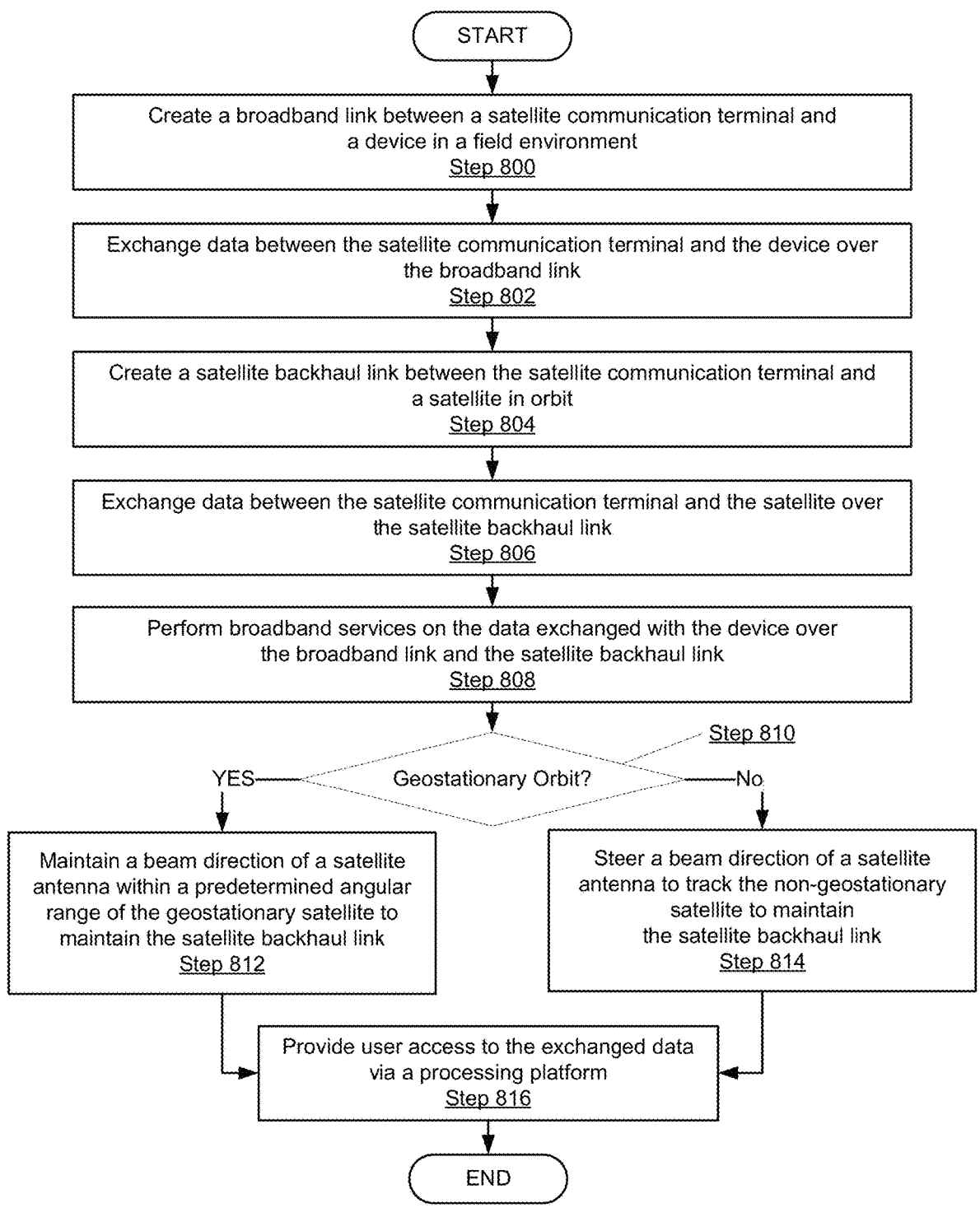
FIG. 8 shows a flowchart describing methods for managing a satellite communication terminal in a field environment, in accordance with one or more embodiments of the invention.

FIG. 8 shows a flowchart describing methods for managing a satellite communication terminal in a field environment, in accordance with one or more embodiments of the invention. The method may be used, for example, to establish a network in a field environment that lacks infrastructure to connect a user or a device to an external network (e.g., the internet, a cloud computing platform, devices located outside of the field environment). The method may be repeated or expanded to support multiple devices, multiple users, and/or multiple networks within the field environment.

It is to be understood that, one or more of the steps shown in the flowchart may be omitted, repeated, and/or performed in a different order than the order shown. Accordingly, the scope of the invention should not be considered limited to the specific arrangement of steps shown in the flowchart.

In Step 800, a broadband link is created between a satellite communication terminal and a device in the field environment. The device may be a monitored asset, a monitoring device, a monitoring system, an access point, a drone, a hub, other sensors, a peripheral sensor, a local sensor, a smartphone, a laptop, but is not particularly limited to these devices. As described above, the broadband link may be a wired or wireless connection between the device and the satellite communication terminal. Furthermore, an optional intervening device (e.g., a hub or an access point) may facilitate the broadband link between the device and the satellite communication terminal. For example, the intervening device may extend the range of the broadband link, boost signals, route/switch signals, or otherwise facilitate the broadband link connecting the satellite communication terminal and the device.

In Step 802, data is exchanged between the satellite communication terminal and the device over the broadband link. Data may be monitoring data, environmental data, networking data, flight/telemetry data, sensor data, voice/text/video data, electronic documents, or user input data, but is not particularly limited to these types of data. Furthermore, other data (i.e., data not associated with the field environment or devices in the field environment) may be exchanged. As discussed above, the exchange of data may be filtered or prioritized based on the authorization of the device or the user of the device. Exchange of the data between the satellite communication terminal and the device may be continuous, periodic, intermittent, scheduled, or triggered by an event (e.g., user interaction, environmental trigger, internal trigger). The data may be buffered by the device, the satellite communication terminal, or an intervening device.

In Step 804, a satellite backhaul link is created between the satellite communication terminal and a satellite in orbit. As discussed above, the satellite interface manages communications over the satellite backhaul link. The satellite may be one or more satellites in one or more geostationary orbits. Alternatively, the satellite may be one or more satellites in one or more non-geostationary orbits.

In Step 806, data is exchanged between the satellite communication terminal and the satellite over the satellite backhaul link. As discussed above, the exchange of data may be filtered or prioritized based on the authorization of the device or the user of the device. Exchange of the data between the satellite communication terminal and the satellite may be continuous, periodic, intermittent, scheduled, or triggered by an event (e.g., user interaction, environmental trigger, internal trigger). The data may be buffered by the satellite communication terminal or the satellite.

In Step 808, broadband services are performed on the data exchanged over the broadband link and the satellite backhaul link with the satellite communication terminal. Generally, broadband services are services that control and manage communications between connected devices in a network. For example, the satellite communication terminal may be connected to one or more local networks comprising the device and secondary devices in the field environment. Alternatively, the satellite communication terminal may be connected to one or more external networks comprising secondary devices outside of the field environment (e.g., connected via the satellite backhaul link, internet, or cloud platform).

In Step 810, the satellite communication terminal determines whether the satellite is in a geostationary orbit or a non-geostationary orbit.

When the determination in Step 810 is YES (i.e., the satellite is in a geostationary orbit), managing the satellite backhaul link continues with Step 812.

In Step 812, the satellite communication terminal maintains a beam direction of the satellite antenna within a predetermined angular range of the geostationary satellite to maintain the satellite backhaul link. The predetermined range may be determined by a minimum signal strength, characteristics of the satellite or satellite antenna, or relative position of the satellite communication terminal, but is not limited to these factors.

As discussed above, in one or more embodiments, the satellite antenna may have a fixed beam direction with respect to the spatial orientation of the satellite antenna that require a user to orient the satellite antenna within the predetermined angular range. Alternatively, the beam direction of the satellite antenna may be steered (e.g., beam-forming) without changing the orientation of the satellite antenna.

The user may be provided instructions to optimally orient the satellite antenna with respect to one or more geostationary satellites. For example, the satellite communication terminal may calculate the optimal orientation for the satellite antenna based on the location information provided by the GPS interface of the satellite communication terminal and the known coordinates of the one or more geostationary satellites. Furthermore, the satellite communication terminal may use one or more sensing devices (e.g., accelerometer or magnetometer) to acquire sensor information to determine the relative orientation of the satellite antenna.

In one or more embodiments, the sensing device may be a signal strength processor or detector that monitors the signal strength of the satellite backhaul link to determine whether the beam direction falls within the predetermined angular range of a geostationary satellites. For example, the received signal strength indicator (RSSI), the estimated signal-to-noise ratio (SNR), the bit rate error, the packet error rate, or any other appropriate signal derived estimate of signal quality of a received satellite signal may be used to calculate the satellite antenna orientation. The instructions may be provided to the user via a smartphone application or an indicator on the satellite communication terminal.

When the determination in Step 810 is NO (i.e., the satellite is in a non-geostationary orbit), managing the satellite backhaul link continues with Step 814.

In Step 814, the satellite communication terminal steers the beam direction of the satellite antenna to track the non-geostationary satellite (e.g., maintain the beam direction within a predetermined angular range of the non-geostationary satellite) to maintain the satellite backhaul link. The predetermined range may be determined by a minimum signal strength, characteristics of the satellite or satellite antenna, or relative position of the satellite communication terminal, but is not necessarily limited to these factors.

Because a non-geostationary satellite moves across the sky, the satellite communication terminal has a limited window of connectivity with a single non-geostationary satellite before it is obscured by the horizon (e.g., 10-15 minutes for Low Earth Orbit satellites). In accordance with one or more embodiments, the satellite communication terminal must coordinate between a plurality of non-geostationary satellites to maintain the satellite backhaul link. The satellite communication terminal steers the beam direction of the satellite antenna to track a first non-geostationary satellite and switch to a second non-geostationary satellite to maintain the satellite backhaul link. Concurrently, the satellite interface manages hand-off of communications between the first and the second non-geostationary satellite. The tracking and hand-off procedure may be repeated multiple times among any given number of non-geostationary satellites to maintain the satellite backhaul link. Those having ordinary skill in the art will appreciate that the tracking and hand-off procedure may also apply to any given number of geostationary satellites in accordance with Step 812.

In one or more embodiments, a processor of the satellite communication terminal may control the beam direction by physically reorienting the satellite antenna (e.g., actuators). In one or more embodiments, the processor may control the beam direction by internally manipulating the beam profile of the satellite antenna (i.e., beam-forming). Alternatively, as discussed above with respect to FIG. 2D, the processor may control the beam direction by switching between one or more of a plurality of antenna elements within the satellite antenna.

The processor may calculate the optimal orientation for the satellite antenna or the beam direction of the satellite based on the location information provided by the GPS interface of the satellite communication terminal and the known coordinates of the one or more non-geostationary satellites. Furthermore, the processor may use sensor information from one or more sensing devices (e.g., accelerometer or magnetometer) to control the relative orientation of the satellite antenna and/or the beam direction.

In one or more embodiments, the sensing device may be a signal strength processor or detector that monitors the signal strength of the satellite backhaul link to determine whether the beam direction falls within the predetermined angular range of the one or more non-geo stationary satellites. For example, the received signal strength indicator (RSSI), the estimated signal-to-noise ratio (SNR), the bit rate error, the packet error rate, or any other appropriate signal derived estimate of signal quality of a received satellite signal may be used to calculate the satellite antenna orientation. The instructions may be provided to the user via a smartphone application or an indicator on the satellite communication terminal.

In Step 816, the user of the device is provided access to the exchanged data via a processing platform. As discussed above, data is made available to the user of the device via the processing platform shared between the satellite communication terminal and a cloud platform (i.e., the cloud). The user may access the data using any type of computing device that is capable of interfacing with the processing platform. Alerts may be provided to the user under certain configurable conditions. For example, an alert may be provided if an authorization or level of service associated with a device or user has been changed or exceeded.

FIG. 9 shows a computing system in accordance with one or more embodiments of the invention. Embodiments of the invention may be implemented on a computing system. Any combination of mobile, desktop, server, embedded, or other types of hardware may be used. For example, as shown in FIG. 9, the computing system 900 may include one or more computer processor(s) 902, associated memory 904 (e.g., random access memory (RAM), cache memory, flash memory, etc.), one or more storage device(s) 906 (e.g., a hard disk, an optical drive such as a compact disk (CD) drive or digital versatile disk (DVD) drive, a flash memory stick, etc.), and numerous other elements and functionalities. The computer processor(s) 902 may be an integrated circuit for processing instructions. For example, the computer processor(s) may be one or more cores, or micro-cores of a processor. The computing system 900 may also include one or more input device(s) 910, such as a touchscreen, keyboard, mouse, microphone, touchpad, electronic pen, or any other type of input device. Further, the computing system 900 may include one or more output device(s) 908, such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system 900 may be connected to a network 912 (e.g., a local area network (LAN), a wide area network (WAN) such as the Internet, mobile network, or any other type of network) via a network interface connection (not shown). The input and output device(s) may be locally or remotely (e.g., via the network 912) connected to the computer processor(s) 902, memory 904, and storage device(s) 906. Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform embodiments of the invention.

Further, one or more elements of the aforementioned computing system 900 may be located at a remote location and connected to the other elements over a network 912. Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

Various embodiments of the invention have one or more of the following advantages. Embodiments of the invention enable an independent communication network (e.g., peer-to-peer "P2P" or full external network connection) to be setup with a single satellite communication terminal (i.e., a communication system in a box). The coverage provided by the satellite communication terminal is scalable (e.g., from small spaces to tens of thousands of acres) with the use of additional intervening devices (e.g., hubs and access points). The number of devices accessing the satellite communication terminal is scalable (e.g., from a few devices to hundreds or thousands of devices) with the use of additional intervening devices. The field environment may comprise an indoor environment, an outdoor environment, or mixed environments. In one or more embodiments, the satellite communication terminal may operate on battery and/or solar power, with no access to the power grid and under hostile conditions including, but not limited to broad temperature ranges, wind, rain, dust, insects and mechanical stress. In one or more embodiments, the satellite communication terminal may operate in environments that offer wired, wireless or no broadband Internet access.

The following use case scenarios are intended to provide examples of possible applications of the satellite communication system, in accordance with one or more embodiments of the invention. The use case scenarios are for illustrative purposes only, and the satellite communication terminal and satellite communication system is not limited to the applications discussed below.

Use Case I: Remote Location

In one or more embodiments of the invention, the field environment may be a remote location without no accessible communication infrastructure (e.g., remote wilderness or a foreign country with an incompatible communication network). The satellite communication terminal may be used to establish a local network to facilitate communication between personnel and equipment within the field environment and/or to establish communication with other networks around the world.

Use Case II: Maritime Field Environment

In one or more embodiments of the invention, the field environment may be an ocean going vessel (e.g., an offshore drilling rig, a cargo container, or cruise ship) without no externally accessible communication infrastructure (e.g., no cellular network at sea). The satellite communication terminal may be used to establish a local network to facilitate communication between personnel and equipment within the field environment and/or to establish communication with other external networks around the world.

For example, on a container ship, a satellite communication terminal may establish broadband links with laptops operated by crew members and monitoring devices attached to cargo containers. The local network maintained by the satellite communication terminal on the container ship may allow the crew members, with proper authorization, communicate with each other via broadband link or access information from the monitoring devices via IoT link. The satellite communication terminal may allow personnel on land, with proper authorization, access to information from the monitoring device via IoT link by connecting through the satellite backhaul link to the satellite communication terminal. Further, the satellite communication terminal may allow the crew members to conduct telephone calls, via broadband link and the satellite backhaul link, with the personnel on land. When the container ship approaches a port and enters the coverage area of an external network (e.g., external cellular network or wired connection in port), the satellite communication terminal may seamless handoff the telephone call (or other appropriate data service) to the external network.

Use Case III. S.O.S. Emergency Network

In one or more embodiments of the invention, the field environment may be a disaster or emergency site with a damaged or unreliable communication network. The satellite communication terminal may be used to establish a local network to facilitate communication between personnel and equipment within the field environment and/or to establish communication with a logistics or humanitarian support network.

Although the invention has been described with respect to a limited number of embodiments, those skilled in the art, having benefit of this disclosure, will appreciate that other embodiments may be devised that do not depart from the scope of the invention. Accordingly, the scope of the invention should be limited only by the attached claims.

What is claimed is:

1. An antenna array system, comprising:
    a plurality of antenna elements arranged in an antenna array in a geometric shape;
    a first sub-array that forms an interior of the antenna array; and
    a second sub-array that forms an exterior of the antenna array,
    wherein the first sub-array is a subset of the second sub-array,
    wherein a number of antenna elements in the first sub-array is greater than a number of antenna elements in the second sub-array, and
    wherein the antenna array system is used to perform a soft hand-off between an outgoing satellite leaving an area with line-of-sight connection to the antenna array system and an incoming satellite entering the area with line-of-sight connection to the antenna array system.

2. The antenna array system according to claim 1, wherein the first sub-array and the second sub-array have identical geometric shapes.

3. The antenna array system according to claim 1, wherein the first sub-array and the second sub-array have different geometric shapes.

4. The antenna array system according to claim 1, wherein the plurality of antenna elements are disposed in the first sub-array and the second sub-array as circle, triangle, elliptical, or like geometrical shape.

* * * * *